US009799418B2

(12) United States Patent
Kani et al.

(10) Patent No.: US 9,799,418 B2
(45) Date of Patent: Oct. 24, 2017

(54) METHOD OF TREATING RADIOACTIVE LIQUID WASTE AND RADIOACTIVE LIQUID WASTE TREATMENT APPARATUS

(71) Applicant: Hitachi-GE Nuclear Energy, Ltd., Hitachi-shi, Ibaraki (JP)

(72) Inventors: Yuuko Kani, Tokyo (JP); Takashi Asano, Hitachi (JP); Yusuke Kitamoto, Hitachi (JP); Noriaki Takeshi, Hitachi (JP); Kenji Noshita, Tokyo (JP); Mamoru Kamoshida, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 57 days.

(21) Appl. No.: 14/913,024

(22) PCT Filed: Jul. 29, 2014

(86) PCT No.: PCT/JP2014/069898
§ 371 (c)(1),
(2) Date: Feb. 19, 2016

(87) PCT Pub. No.: WO2015/025681
PCT Pub. Date: Feb. 26, 2015

(65) Prior Publication Data
US 2016/0211040 A1 Jul. 21, 2016

(30) Foreign Application Priority Data

Aug. 23, 2013 (JP) .................................. 2013-173407
Sep. 19, 2013 (JP) .................................. 2013-194226
Sep. 19, 2013 (JP) .................................. 2013-194469

(51) Int. Cl.
*G21F 9/00* (2006.01)
*G21F 9/12* (2006.01)
*G21F 9/06* (2006.01)
*G01T 7/04* (2006.01)
*G01T 1/167* (2006.01)
*B01D 15/10* (2006.01)
*B01D 37/00* (2006.01)
*B03C 5/00* (2006.01)

(52) U.S. Cl.
CPC .............. *G21F 9/12* (2013.01); *B01D 15/10* (2013.01); *B01D 37/00* (2013.01); *B03C 5/00* (2013.01); *G01T 1/167* (2013.01); *G01T 7/04* (2013.01); *G21F 9/06* (2013.01); *B03C 2201/24* (2013.01)

(58) Field of Classification Search
CPC . G21F 9/302; G21F 9/002; G21F 9/00; B09C 1/02
USPC ........................................................... 588/2
See application file for complete search history.

(56) References Cited

U.S. PATENT DOCUMENTS

2007/0131621 A1   6/2007 Denton

FOREIGN PATENT DOCUMENTS

| JP | 61-40593 A    | 2/1986  |
|----|---------------|---------|
| JP | 2002-31697 A  | 1/2002  |
| JP | 2009-520185 A | 5/2009  |
| JP | 2009-216577 A | 9/2009  |
| JP | 2009-220067 A | 10/2009 |
| JP | 2012-185013 A | 9/2012  |
| JP | 2013-57599 A  | 3/2013  |
| JP | 2013-108808 A | 6/2013  |
| JP | 2013-170959 A | 9/2013  |

OTHER PUBLICATIONS

International Search Report (PCT/ISA/210) issued in PCT Application No. PCT/JP2014/069898 dated Oct. 28, 2014, with English translation (four (4) pages).
Akira Ikeda et al., Simplified Active Water Retrieve and Recovery System for Fukushima, Proceedings of GLOBAL 2011, Dec. 11-16, 2011, Makuhari, Japan, Paper No. 524705 (five (5) pages).

*Primary Examiner* — Edward Johnson
(74) *Attorney, Agent, or Firm* — Crowell & Moring LLP

(57) ABSTRACT

Provided is a method of treating radioactive liquid waste which reduces the amount of radioactive waste to be generated and is capable of removing a radioactive nuclide from radioactive liquid waste to the extent that the concentration thereof is less than or equal to the measurement lower limit using a simple apparatus configuration. A filtration device is connected to a colloid removal device by a connection pipe. An adsorption tower positioned at the highest stream of an adsorption device is connected to the colloid removal device by a connection pipe. The colloid removal device includes an electrostatic filter. Respective adsorption towers in the adsorption device are sequentially connected by a pipe. A discharge pipe is connected to the adsorption tower positioned at the lowest stream of the adsorption device. Radioactive liquid waste, containing particles having a particle diameter of 1 μm or greater, negatively charged colloids, and a radioactive nuclide, is supplied to the filtration device. The particles having a particle diameter of 1 μm or greater are removed by the filtration device and the negatively charged colloids are removed by the electrostatic filter that is positively charged. The radioactive nuclide is removed by the adsorption tower.

27 Claims, 6 Drawing Sheets

[Fig. 1]
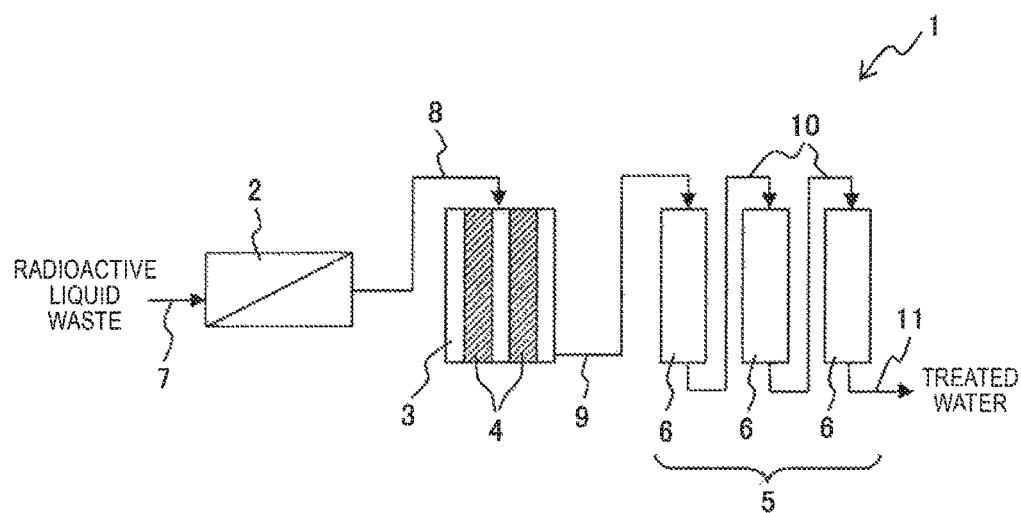
[Fig. 2]
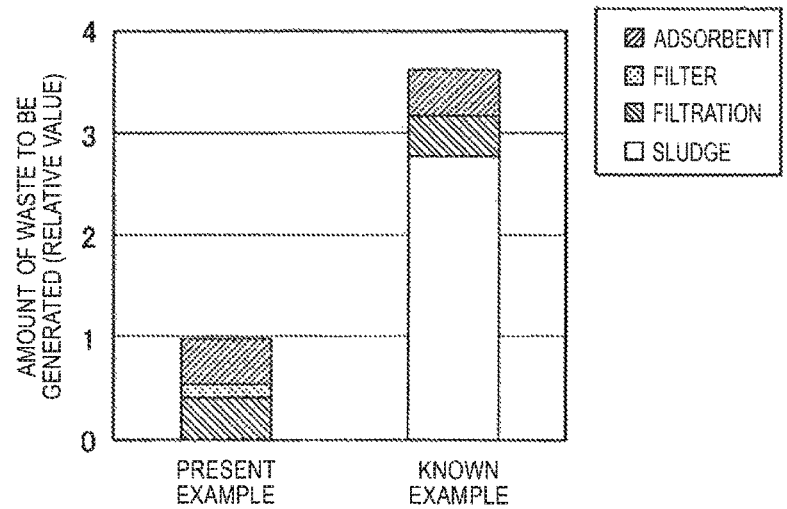

[Fig. 3]
| ITEM | CHEMICAL FORM OF RUTHENIUM (Ru) | | |
|---|---|---|---|
| | CATION | ANION | NEUTRAL DISSOLVED SPECIES |
| ACIDITY (pH 2) | UP TO 58% $RuCl_2^+$ ETC. | UP TO 12% $RuCl_4^-$ ETC. | UP TO 30% $RuCl_3$ ETC. |
| NEUTRALITY (pH 7) | UP TO 26% $Ru(OH)_2^+$ ETC. | UP TO 0% | UP TO 74% $Ru(OH)_4$ ETC. |
| ALKALINITY (pH 12) | UP TO 0% | UP TO 0% | UP TO 100% $Ru(OH)_4$ |
[Fig. 4]
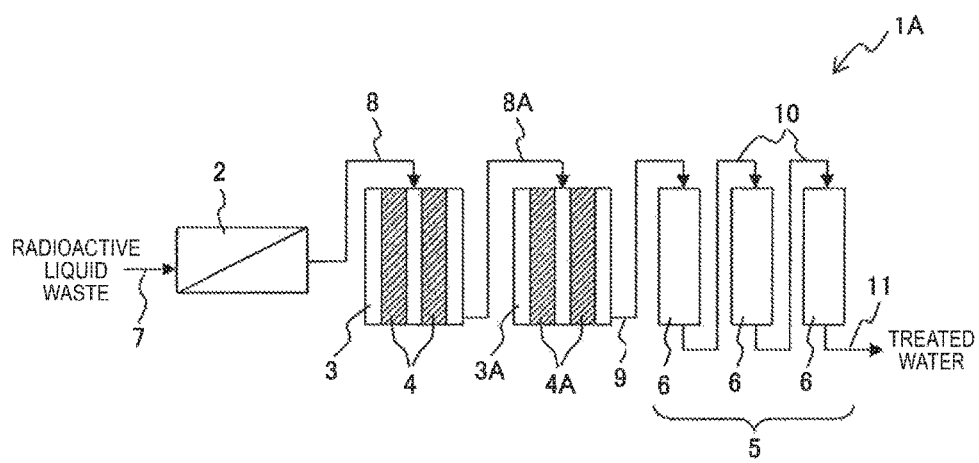

[Fig. 5]
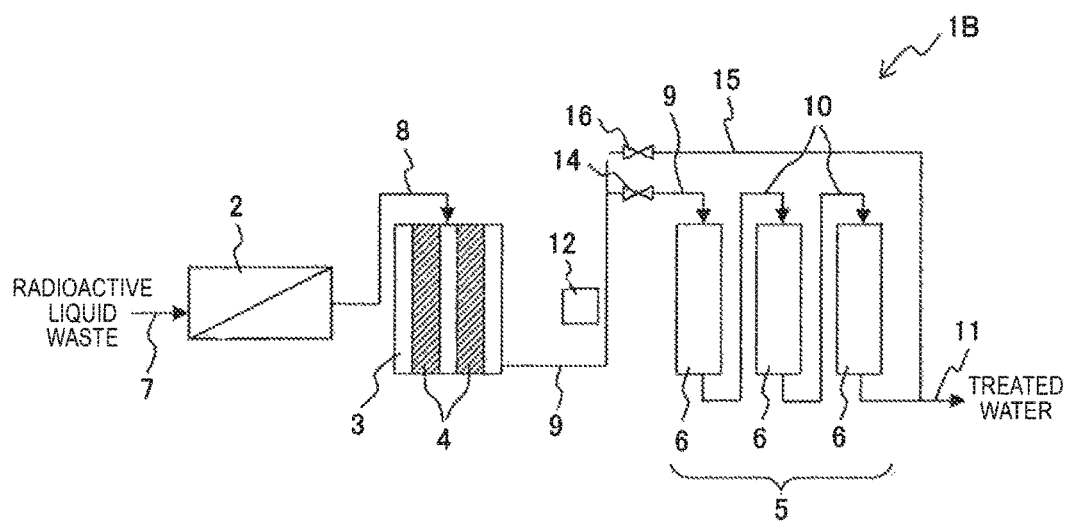
[Fig. 6]
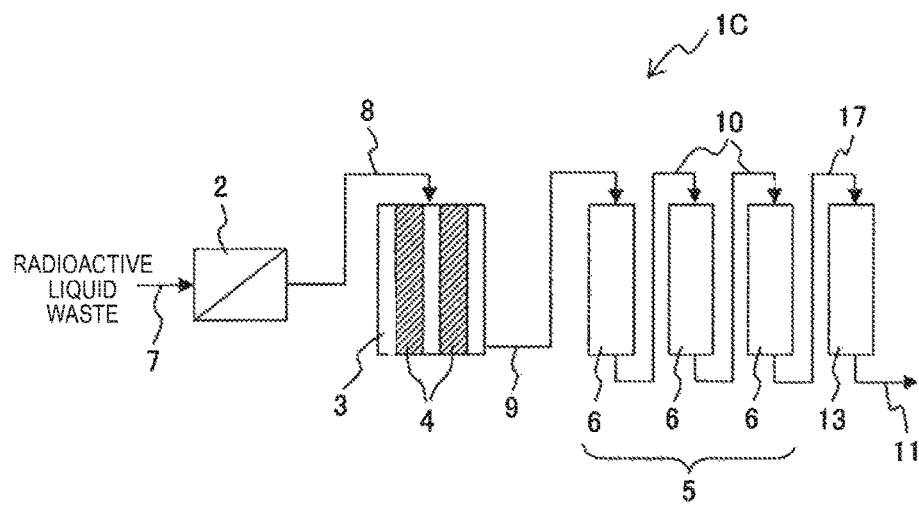

[Fig. 7]
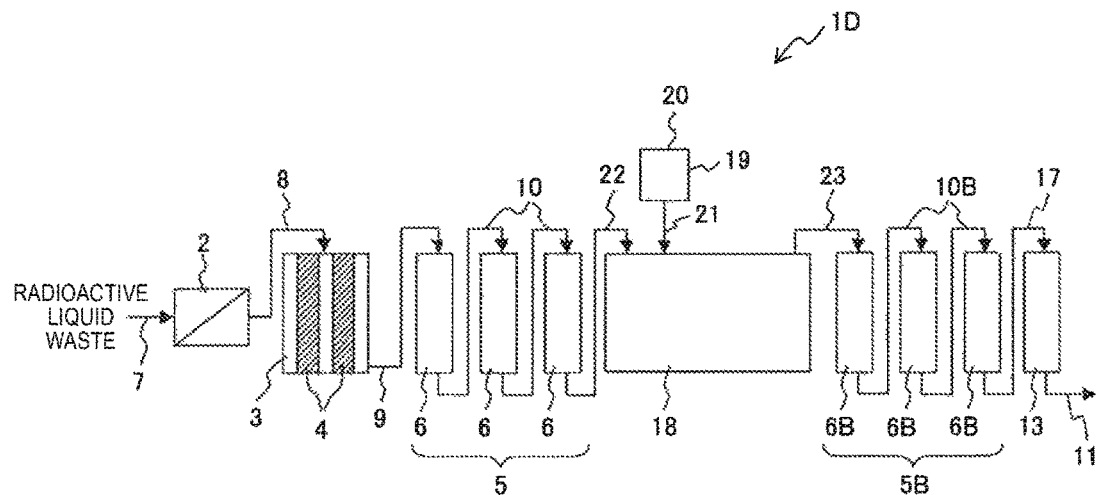
[Fig. 8]
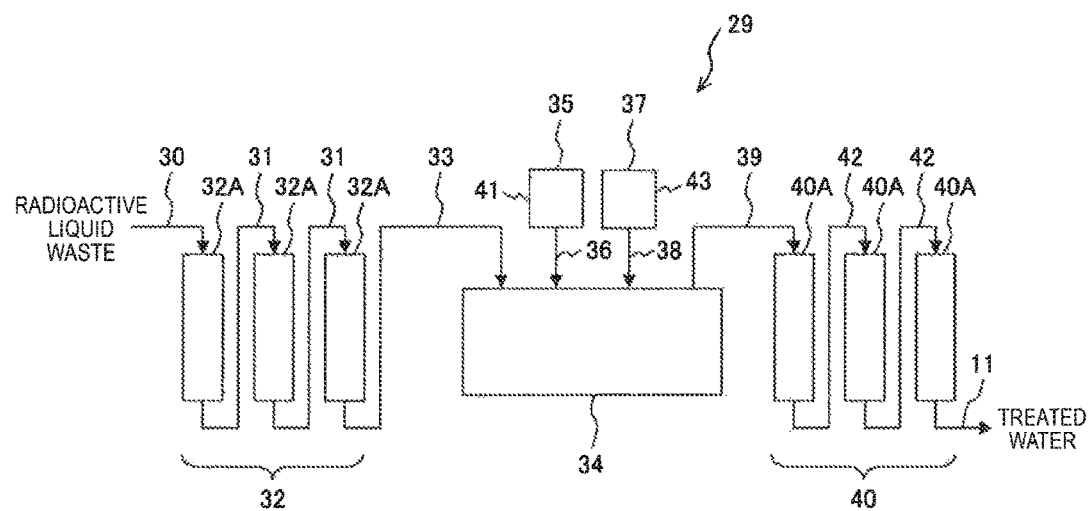

[Fig. 9]
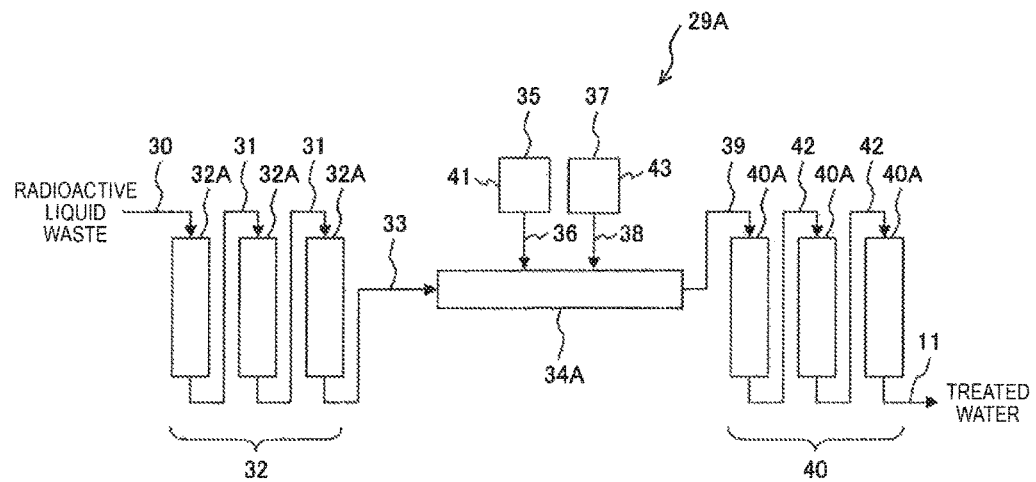
[Fig. 10]
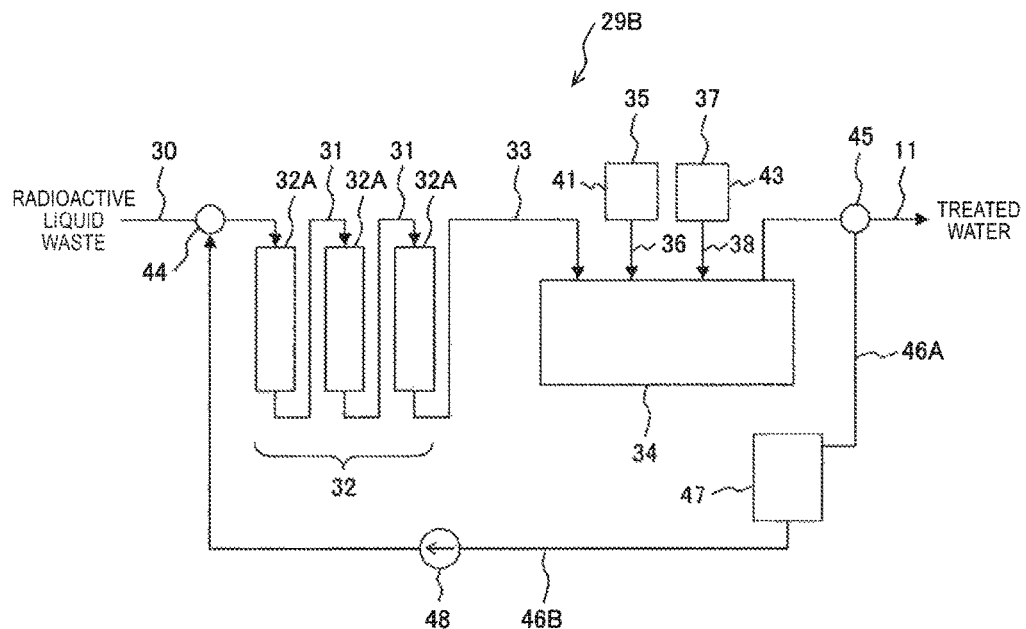

[Fig. 11]
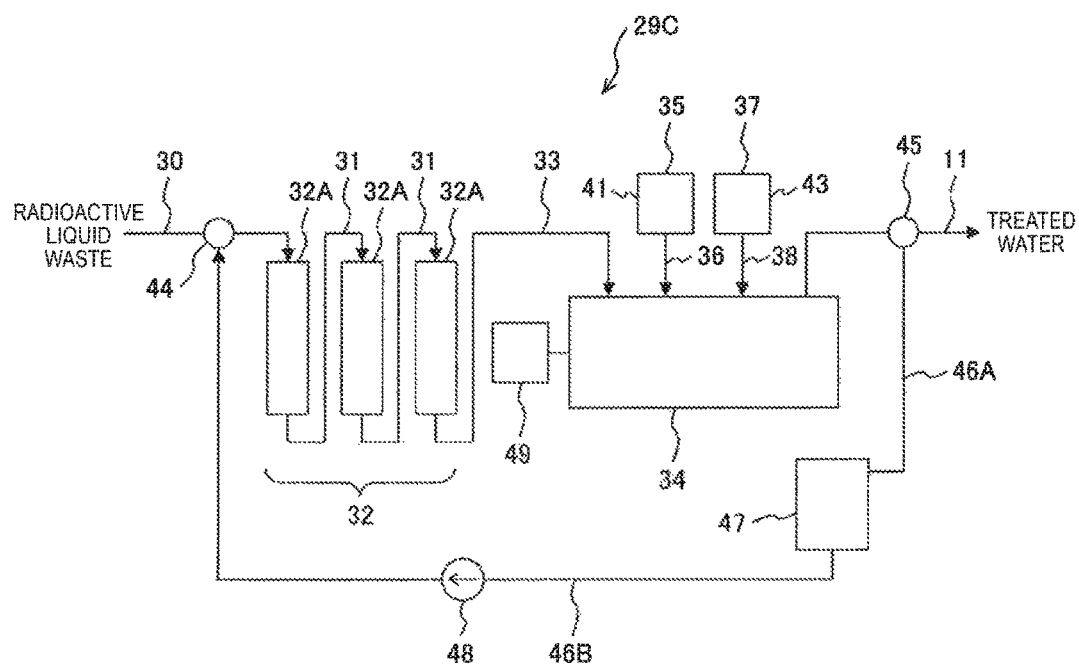

US 9,799,418 B2

METHOD OF TREATING RADIOACTIVE LIQUID WASTE AND RADIOACTIVE LIQUID WASTE TREATMENT APPARATUS

TECHNICAL FIELD

The present invention relates to a method of treating radioactive liquid waste and a radioactive liquid waste treatment apparatus, and particularly relates to a method of treating radioactive liquid waste and a radioactive liquid waste treatment apparatus suitable for removing a radioactive nuclide contained in radioactive liquid waste that includes particle components such as soil.

BACKGROUND ART

As one of a method of treating radioactive liquid waste containing radioactive nuclides which are generated in nuclear facilities, for example, nuclear power plants, an adsorption treatment method in which radioactive nuclides are removed from radioactive liquid waste using an ion exchange resin or the like is exemplified. This adsorption treatment method is a treatment method of removing ionic radioactive nuclides through adsorption using an inorganic or organic adsorbent or an ion exchange resin.

It is assumed that radioactive liquid waste generated in nuclear facilities have various properties (containing components, the pH value, and the like). For example, acidic radioactive liquid waste and alkaline radioactive liquid waste can be considered. Further, depending on an adsorbent, it is necessary for the adsorbent to have an appropriate pH region in order to exhibit adsorption performance. In a case where such an adsorbent is selected, a treatment in which the pH of radioactive liquid waste is adjusted to acidic or alkaline according to the adsorbent, and then radioactive nuclides contained in the radioactive liquid waste are adsorbed by the adsorbent, is performed in some cases. In both acidic and alkaline radioactive liquid waste, it is considered that the pH of the radioactive liquid waste after the adsorption treatment is performed may vary according to the properties at the time when the radioactive liquid waste was generated, radioactive nuclides to be contained therein, or the selected adsorbent.

For a treatment of the radioactive liquid waste after the radioactive nuclides are removed, various options such as concentration volume reduction, storage, solidification, or release out of the system (for example, to the environment) may be considered. In all cases, the treatments are performed after the pH of the radioactive liquid waste is adjusted close to neutral. Accordingly, in a case where the pH of the radioactive liquid waste after the adsorption treatment is performed on the radioactive nuclides is out of the neutral region (for example, pH 4 to pH 9), a process of adjusting the pH of the radioactive liquid waste needs to be carried out. When the radioactive liquid waste becomes acidic, a treatment of adding an alkali or a deacidification treatment is performed. When the radioactive liquid waste is alkaline, the radioactive liquid waste is required to be neutralized by adding an acid.

An example of the treatment method of adsorbing and removing radioactive nuclides from radioactive liquid waste is described in Ikeda et al., Proceedings of GLOBAL 2011, Dec. 11 to 16, 2011, Makuhari, Japan, USA, Paper No. 524705 (2011). In the treatment method of adsorbing and removing the radioactive nuclides, ionic radioactive nuclides contained in radioactive liquid waste are adsorbed by an adsorbent and then removed by allowing the radioactive liquid waste to pass through a container filled with the adsorbent. Further, before the radioactive liquid waste is supplied to the container filled with the adsorbent, a particulate substance contained in the radioactive liquid waste is removed using a filtration device.

Moreover, for example, JP-A-2013-57599 describes a method of treating radioactive liquid waste. Radioactive cesium contained in radioactive liquid waste is adsorbed by iron ferrocyanide by adding the iron ferrocyanide to a container in which radioactive liquid waste flows and then radioactive strontium contained in the radioactive liquid waste is adsorbed by a zeolite-based adsorbent by adding the zeolite-based adsorbent to the radioactive liquid waste in the container. In addition, an inorganic coagulant is added to the radioactive liquid waste. Due to the action of the inorganic coagulant, aggregates of solid particles, containing particles of the iron ferrocyanide to which radioactive cesium is adsorbed and particles of the zeolite-based adsorbent to which radioactive strontium is adsorbed, are formed and the aggregates are precipitated and separated.

Further, in a method of treating radioactive liquid waste described in JP-A-2002-31697, a filtration device and an ion exchange device are used. An ultrafiltration membrane is used as the filtration device. Colloid components contained in radioactive liquid waste are removed by the ultrafiltration membrane and then ionic radioactive nuclides contained in the radioactive liquid waste are removed by the ion exchange device. In a method of treating radioactive liquid waste described in JP-A-2013-108808, colloid components contained in radioactive liquid waste are removed by a filtration device (for example, an ultrafiltration membrane). The radioactive liquid waste is supplied to the filtration device after sodium hydroxide is added to the radioactive liquid waste and the pH of the radioactive liquid waste is adjusted to a predetermined value. The radioactive liquid waste from which colloids are removed by the filtration device is supplied to an adsorption tower filled with a titanate-based adsorbent. Since the titanate-based adsorbent can easily adsorb strontium, the strontium contained in the radioactive liquid waste is removed in the adsorption tower.

Moreover, in a case where radioactive liquid waste contains salts at a high concentration, the adsorption of radioactive nuclides may be disturbed by the salts.

Meanwhile, in a method of treating radioactive liquid waste described in JP-A-61-40593, a powdery (or particulate) substance that adsorbs radioactive nuclides is added to radioactive liquid waste by performing a reaction of forming radioactive nuclides and chelate and then the substance to which the radioactive nuclides are adsorbed is separated out through filtration.

Further, JP-A-2013-170959 describes a method of treating radioactive liquid waste in which an oxidizing agent or a reducing agent is added to radioactive liquid waste containing radioactive nuclides and the radioactive nuclides are adsorbed and removed by an adsorbent. Moreover, JP-A-2013-170959 describes a method of treating radioactive liquid waste in which an oxidizing agent or a reducing agent is added to radioactive liquid waste containing radioactive nuclides, a pH adjusting agent is added thereto, and then the radioactive nuclides are adsorbed and removed by an adsorbent and a method of treating radioactive liquid waste in which a pH adjusting agent is added to radioactive liquid waste containing radioactive nuclides and then the radioactive nuclides are adsorbed and removed by an adsorbent.

CITATION LIST

Patent Literature

PTL 1: JP-A-2013-57599
PTL 2: JP-A-2002-31697
PTL 3: JP-A-2013-108808
PTL 4: JP-A-61-40593
PTL 5: JP-A-2013-170959

Non-Patent Literature

NPL 1: Ikeda et al., Proceedings of GLOBAL 2011, Dec. 11 to 16, 2011, Makuhari, Japan, USA, Paper No. 524705 (2011)

SUMMARY OF INVENTION

Technical Problem

In a case where treated water obtained by removing radioactive nuclides from radioactive liquid waste is discharged outside of nuclear facilities, the concentration of the radioactive nuclides in the treated water needs to be less than or equal to a reference value. As an example of the reference value, a case in which the measurement result of the concentration of the radioactive nuclides measured by a radiation measuring machine with a designated specification is less than or equal to the measurement lower limit of the radiation measuring machine is exemplified.

Radioactive liquid waste containing radioactive nuclides, particularly, contaminated water generated in nuclear facilities, occasionally contains particulate substances such as soil, sand components, concrete pieces, and plants. In most cases, the radioactive liquid waste is accumulated in a tank or the like and substances which are contained in the radioactive liquid waste and have a large particle diameter are precipitated in the tank and then removed. Thereafter, the radioactive nuclides contained in the radioactive liquid waste, from which substances having a large particle diameter are removed, are removed by an adsorbent by performing a filtration operation or removed by adding a flocculating agent to the radioactive liquid waste and allowing the agent to be precipitated.

The present inventors examined distribution of cesium-137 using a soil sample to which cesium-137, which is a radioactive nuclide, is attached. First, the soil sample is suspended in water and the water containing the soil sample is allowed to stand still for a while to be separated into precipitated components and supernatant water. Next, the supernatant water is filtered using filter paper having apertures different from each other, and then the concentrations of particles having a particle diameter of 1 μm or greater and fine particles having a particle diameter of 1 μm or less (colloid) in the supernatant water and the concentration of cesium-137 in ion components are respectively measured. As a result, it is understood that the cesium-137 is contained in particles having a diameter of 1 μm or greater, fine particles and colloids having a particle diameter of less than 1 μm, and a solution at concentrations of 98.5%, 1%, and 0.5% respectively. From this, in order to remove the radioactive nuclides to the extent that the concentration of the radioactive nuclides is less than or equal to the measurement lower limit of the radiation measuring machine, it is understood that fine particles and colloids are required to be removed in addition to particle components which can be removed by physical filtration and ion components which can be removed by chemisorption of an adsorbent.

In regard to removal of particulate substances using a filtration device and adsorption and separation of ion components using an adsorbent in the method described in Ikeda et al., Proceedings of GLOBAL 2011, Dec. 11 to 16, 2011, Makuhari, Japan, USA, Paper No. 524705 (2011), since fine particles and colloid components cannot be removed by the filtration device and the adsorbent, the radioactivity concentration of treated water is unlikely to be adjusted to less than or equal to the measurement lower limit.

Meanwhile, in the method of treating radioactive liquid waste described in JP-A-2013-57599, when a flocculating agent is added to the radioactive liquid waste for occurrence of precipitation, since fine particles and colloids are aggregated and precipitated in a case where the fine particles and the colloids are contained in the radioactive liquid waste together with an adsorbent to which particles and ion components are adsorbed, the radioactivity concentration of treated water can be adjusted to be less than or equal to the measurement lower limit. However, since the amount of precipitation containing radioactive substances generated by addition of a flocculating agent is large, there is a problem in that a method of storing precipitation containing moisture and a disposal method are difficult to perform.

In the method of removing radioactive nuclides respectively described in JP-A-2002-31697 and JP-A-2013-108808, particle components, fine particles, and colloid components can be removed by a provided ultrafiltration device. However, since the ultrafiltration membrane has a small pore size, the ultrafiltration membrane may be blocked in a case where a large amount of particle components are removed.

In the method of treating radioactive liquid waste described in JP-A-2002-31697, a clogging prevention device is provided in the ultrafiltration membrane. The clogging prevention device has physical mechanisms with respect to the ultrafiltration membrane such as a vibrating mechanism that vibrates the ultrafiltration membrane and a rotating mechanism that rotates the ultrafiltration membrane. The particle components deposited on the ultrafiltration membrane are separated from the ultrafiltration membrane and discharged as a slurry by applying a physical impact to the ultrafiltration membrane from the clogging prevention device. There is a problem with the storage and preservation of a slurry having a high water content from the viewpoints of the amount of generation and stability of properties of radioactive waste. In the method of treating radioactive liquid waste described in JP-A-2013-108808, pH adjustment is required, as well as a reagent for pH adjustment, a stirring device, and an analyzing device for pH confirmation.

Moreover, when the pH adjustment is performed by adding chemical agents such as an acid and an alkaline to the radioactive liquid waste after the adsorption treatment, the number of processes of the method of treating the radioactive liquid waste is increased and this leads to an increase in the concentration of salts in the radioactive liquid waste, and thus the amount of radioactive waste that is ultimately generated is increased, which is problematic.

Moreover, according to the method of treating radioactive liquid waste described in JP-A-61-40593, it is possible to reduce the influence of the disturbance of salts and to separate radioactive nuclides from radioactive liquid waste. Meanwhile, since it is assumed that the reaction of forming radioactive nuclides and chelate is performed, the degree of effects of the radioactive nuclides in which the reaction of forming chelate is not performed is limited.

The radioactive nuclides contained in the radioactive liquid waste may have a single chemical form or a plurality of chemical forms depending on the type thereof. Particularly, the radioactive nuclides contained in the radioactive liquid waste including salts tend to be present in a plurality of chemical forms, even when these have the same element as each other. As described above, in the radioactive nuclides in the plurality of chemical forms, the charge of the radioactive nuclides varies depending on the difference in the chemical forms, even when the radioactive nuclides have the same element as each other. That is, the radioactive nuclides may be positive, negative, or neutral. For this reason, in order to separate and remove a certain kind of radioactive nuclide, it is necessary to prepare plural kinds of adsorption materials.

Since the concentration of radioactive nuclides contained in radioactive liquid waste is typically extremely small, it is difficult to measure the chemical forms of the radioactive nuclides in advance using chemical analysis. Accordingly, it is not easy to select an adsorption material to be used for separation corresponding to each chemical form of each kind of radioactive nuclide.

According to the method of treating the radioactive liquid waste described in JP-A-2013-170959, even in a case where the chemical form of the radioactive nuclide is unclear, it is possible to efficiently separate the radioactive nuclide from the radioactive liquid waste. This is because the chemical form of the radioactive nuclide is adjusted to a form which can be easily adsorbed and removed by adding an oxidizing agent, a reducing agent, or a pH adjusting agent to the radioactive liquid waste. In this case, even in the case where the adjustment is performed on the radioactive liquid waste, all the radioactive nuclides contained in the radioactive liquid waste are not necessarily adjusted to the chemical forms which can be easily adsorbed and removed and some of the radioactive nuclides occasionally remain in the chemical forms which are unlikely to be adsorbed.

A first object of the present invention is to provide a method of treating radioactive liquid waste in which the amount of radioactive waste to be generated is reduced and radioactive substances can be removed from the radioactive liquid waste using a simple apparatus configuration to the extent that the concentration thereof is less than or equal to the measurement lower limit.

A second object of the present invention is to provide a method of treating radioactive liquid waste and a radioactive liquid waste treatment apparatus in which addition of treatment processes and an increase in the radioactive waste can be suppressed and the final pH of the radioactive liquid waste can be adjusted to be in a neutral region (pH 4 to pH 9).

A third aspect of the present invention is to provide a method of treating radioactive liquid waste and a radioactive liquid waste treatment apparatus in which the removal efficiency of the radioactive nuclides contained in the radioactive liquid waste can be further improved.

Solution to Problem

According to a first invention that achieves the first object described above, there is provided a method of treating radioactive liquid waste including: supplying radioactive liquid waste which contains a colloidal substance, a particulate substance having a particle diameter greater than that of the colloidal substance, and a radioactive substance to a filtration device such that the particulate substance is removed by the filtration device; removing the colloidal substance which is contained in the radioactive liquid waste discharged from the filtration device using an electrostatic filter; allowing the radioactive liquid waste from which the colloidal substance is removed to be supplied to an adsorption device; and removing the radioactive substance contained in the radioactive liquid waste using the adsorption device.

Since the particulate substance having a particle diameter greater than that of the colloidal substance is removed by the filtration device, the colloidal substance is removed by the electrostatic filter, and the radiation substance is removed by the adsorption device, the amount of radioactive waste to be generated can be reduced using a simple apparatus configuration and the radioactive substance can be removed to the extent that the concentration thereof is less than or equal to the measurement lower limit.

According to a second invention that achieves the second object described above, there is provided a method of treating radioactive liquid waste comprising: supplying radioactive liquid waste which contains a colloidal substance, a particulate substance having a particle diameter greater than that of the colloidal substance, and a radioactive substance to a filtration device such that the particulate substance is removed by the filtration device; removing the colloidal substance which is contained in the radioactive liquid waste discharged from the filtration device; allowing the radioactive liquid waste from which the colloidal substance is removed to be supplied to a first adsorption device; removing a radioactive nuclide contained in the radioactive liquid waste using the first adsorption device; arranging the radioactive liquid waste discharged from the first adsorption device on the downstream side of the first adsorption device; and supplying the discharged radioactive liquid waste to a second adsorption device filled with an adsorbent that carries an oxine group on the surface thereof.

Since the radioactive liquid waste discharged from the first adsorption device is supplied to the second adsorption device which is arranged on the downstream side of the first adsorption device and filled with an adsorbent carrying the oxine group on the surface thereof, the pH of the radioactive liquid waste can be adjusted to be in a range of 4 to 9 and the amount of the radioactive liquid waste to be generated can be reduced without adding a chemical agent that adjusts the pH to the radioactive liquid waste.

It is preferable that at least one of an oxidizing agent, a pH adjusting agent, and a reducing agent is injected to the radioactive liquid waste in which ions of the radioactive nuclide are removed using the first adsorption device; the ions of the radioactive nuclide, which are generated in the radioactive liquid waste due to the injection of at least one of the oxidizing agent, the pH adjusting agent, and the reducing agent are removed by an adsorbent in a third adsorption device; and the radioactive liquid waste discharged from the third adsorption device is supplied to the second adsorption device.

In this manner, since at least one of an oxidizing agent, a pH adjusting agent, and a reducing agent is injected to the radioactive liquid waste from which ions are removed using the first adsorption device and ions of the radioactive nuclide which are generated in the radioactive liquid waste due to the injection of at least one of the oxidizing agent, the pH adjusting agent, and the reducing agent are removed by the adsorbent in the second adsorption device, the removal efficiency of the radioactive nuclide contained in the radioactive liquid waste can be further improved.

According to a third invention that achieves the third object described above, there is provided a method of treating radioactive liquid waste including: supplying radioactive liquid waste which contains a radioactive nuclide to a first adsorption device; removing ions of the radioactive nuclide contained in the radioactive liquid waste by an adsorbent in the first adsorption device; injecting at least one of an oxidizing agent, a pH adjusting agent, and a reducing agent to the radioactive liquid waste discharged from the first adsorption device; and removing the ions of the radioactive nuclide, which are generated in the radioactive liquid waste due to the injection of at least one of the oxidizing agent, the pH adjusting agent, and the reducing agent, by an adsorbent in a second adsorption device.

Since at least one of an oxidizing agent, a pH adjusting agent, and a reducing agent is injected to the radioactive liquid waste from which ions are removed using the first adsorption device and ions of the radioactive nuclide which are generated in the radioactive liquid waste due to the injection of at least one of the oxidizing agent, the pH adjusting agent, and the reducing agent are removed by the adsorbent in the second adsorption device, the removal efficiency of the radioactive nuclide contained in the radioactive liquid waste can be further improved.

The third object described above can be achieved by providing a method of treating radioactive liquid waste including: supplying radioactive liquid waste which contains a radioactive nuclide to an adsorption device; removing ions of the radioactive nuclide contained in the radioactive liquid waste by an adsorbent in the adsorption device; injecting at least one of an oxidizing agent, a pH adjusting agent, and a reducing agent to the radioactive liquid waste discharged from the adsorption device; supplying the radioactive liquid waste which contains ions, generated due to the injection of at least one of the oxidizing agent, the pH adjusting agent, and the reducing agent, to the adsorption device; and removing the ions of the radioactive nuclide generated due to the injection of at least one of the oxidizing agent, the pH adjusting agent, and the reducing agent contained in the radioactive liquid waste, by the adsorbent in the adsorption device.

Advantageous Effects of Invention

According to the first invention, it is possible to reduce the amount of radioactive waste to be generated and remove the radioactive substance from the radioactive liquid waste using a simple apparatus configuration to the extent that the concentration thereof is less than or equal to the measurement lower limit.

According to the second invention, it is possible to reduce the amount of radioactive waste to be generated and adjust the pH of the radioactive liquid waste close to neutral using a simple apparatus configuration.

According to the third invention, it is possible to remove the radioactive nuclide in the radioactive liquid waste by the adsorbent with more excellent efficiency.

BRIEF DESCRIPTION OF DRAWINGS

FIG. 1 is a configuration view illustrating a radioactive liquid waste treatment apparatus used for a method of treating radioactive liquid waste of Example 1 which is a preferred example of the present invention.

FIG. 2 is an explanatory diagram illustrating the amount of radioactive waste generated due to the method of treating radioactive liquid waste of Example 1.

FIG. 3 is an explanatory diagram showing chemical forms of radioactive ruthenium contained in each of the radioactive liquid waste with a different pH value and the percentage to be removed for each chemical form of the radioactive ruthenium.

FIG. 4 is a configuration view illustrating a radioactive liquid waste treatment apparatus used for a method of treating radioactive liquid waste of Example 2 which is another preferred example of the present invention.

FIG. 5 is a configuration view illustrating a radioactive liquid waste treatment apparatus used for a method of treating radioactive liquid waste of Example 3 which is another preferred example of the present invention.

FIG. 6 is a configuration view illustrating a radioactive liquid waste treatment apparatus used for a method of treating radioactive liquid waste of Example 4, which is another preferred example of the present invention.

FIG. 7 is a configuration view illustrating a radioactive liquid waste treatment apparatus used for a method of treating radioactive liquid waste of Example 5 which is another preferred example of the present invention.

FIG. 8 is a configuration view illustrating a radioactive liquid waste treatment apparatus used for a method of treating radioactive liquid waste of Example 6 which is another preferred example of the present invention.

FIG. 9 is a configuration view illustrating a radioactive liquid waste treatment apparatus used for a method of treating radioactive liquid waste of Example 7 which is another preferred example of the present invention.

FIG. 10 is a configuration view illustrating Example 8 of a radioactive liquid waste treatment apparatus used for a method of treating radioactive liquid waste of the present invention.

FIG. 11 is a configuration view illustrating Example 9 of a radioactive liquid waste treatment apparatus used for the method of treating radioactive liquid waste of the present invention.

DESCRIPTION OF EMBODIMENTS

The present inventors conducted a test to examine a change in the pH of radioactive liquid waste accompanied by adsorption of radioactive nuclides when a process of adsorbing and treating ions of various radioactive nuclides is developed. This test is performed based on the concept that a treatment of adsorbing a radioactive nuclide using an adsorbent, performed in the previous stage, may affect the adsorption performance of another radioactive nuclide using another adsorbent, performed in the subsequent stage, depending on the combination of adsorbents. As a result, even when the property of the radioactive liquid waste is ether of acidic or alkaline, it was found that the pH of the radioactive liquid waste can be adjusted to be in a range of 4 to 9 by passing the radioactive liquid waste through a packed bed of oxine impregnated activated carbon, which is known to adsorb transition element ions.

Based on new knowledge obtained based on the test results described above, the present inventors found that the pH of the radioactive liquid waste from which radioactive nuclides are removed can be adjusted to be in a range of 4 to 9 by arranging an adsorption tower filled with oxine impregnated activated carbon on the downstream side of an adsorption device that adsorbs and removes the radioactive nuclides contained in the radioactive liquid waste, thereby realizing the present invention.

In regard to the treatment of radioactive liquid waste, it is assumed that the treatment is performed on radioactive liquid waste containing cations such as radioactive cesium or strontium; anions such as radioactive antimony, and transition metal ions such as radioactive cobalt. In order to selectively adsorb radioactive cesium and radioactive strontium, for example, natural zeolite, artificial zeolite, or a silicotitanate is used. In order to selectively adsorb radioactive antimony or the like, for example, a hydrous cerium oxide-carrying adsorbent is used. In order to selectively adsorb radioactive heavy metals (such as ions of transition metals and rare earth), for example, oxine impregnated activated carbon is used.

TABLE 1

|  | Input location | Removing Cs and Sr | Removing anions | Removing heavy metals |
|---|---|---|---|---|
| Test water-1 | (9.5) | Silicotitanate (6.4) | Hydrous cerium oxide-carrying adsorbent (6.7) | Oxine impregnated carbon (9.0) |
| Test water-2 | (9.2) | Zeolite → Silicotitanate (8.9) | Hydrous cerium oxide-carrying adsorbent (9.5) | Oxine impregnated carbon (6.1) |
| Test water-3 | (7.7) | Ferrocyanide → Titanic acid (11.8) | Ferrocyanide (5.8) | Oxine impregnated carbon (6.6) |

Table 1 shows adsorbents which can be used in a case where the radioactive ions are adsorbed and removed and the pH values of each test water sample before and after the adsorbents pass through a packed bed. All of test water-1, test water-2, and test water-3 samples are simulated water of radioactive liquid waste. The numeric values in the parentheses of the input location show the respective pH values of the test water-1, the test water-2, and the test water-3 samples in the input location of a packed bed of an adsorbent. The respective numerical values in the parentheses of respective columns of "removing Cs and Sr," "removing anions," and "removing heavy metals" show the pH values after each of the test water samples has passed through the packed bed of an adsorbent. In all cases, the pH of each of the test water sample can be adjusted to be in a range of 4 to 9 by arranging an oxine impregnated carbon packed bed in the final stage of adsorption of the radioactive nuclides.

Further, in addition to the basic study described above, the present inventors examined the problems and the countermeasures from a viewpoint of a device system. Only by the arrangement of an adsorption tower filled with an oxine impregnated activated carbon, can dissolved components contained in the radioactive liquid waste be deposited and blocked in the adsorption tower after the pH of the radioactive liquid waste in the adsorption tower is adjusted to be in a neutral region. As a countermeasure, it is necessary to prepare a system configuration that reduces as much as possible the deposition potential of the solid content by arranging a filtration device and a colloid removal device before the adsorbing process.

As a result of the above-described examination, the present inventors found the first new knowledge that the radioactive nuclides contained in the radioactive liquid waste are removed by an adsorption device to which the radioactive liquid waste from which the colloidal substance is removed is supplied in the previous stage, the radioactive liquid waste discharged from the adsorption device in the previous stage is supplied to an adsorption device filled with an adsorbent carrying an oxine group on the surface thereof in the subsequent stage, and thus the pH of the radioactive liquid waste discharged from the adsorption device in the subsequent stage can be adjusted to be in a range of 4 to 9.

When the radioactive nuclides are removed from the radioactive liquid waste using an adsorbent, a cation exchange resin, a chelate resin, an anion exchange resin, and the like are used. These adsorbents have high removal performance with respect to ions having a positive charge, ions having a negative charge, and ions forming a complex. However, the adsorbents only have relatively low removal performance with respect to colloids and neutral dissolved species.

For this reason, in order to remove the radioactive nuclides contained in the radioactive liquid waste with excellent efficiency, it is preferable to adjust the chemical forms of the radioactive nuclides contained in the radioactive liquid waste using an oxidizing agent, a reducing agent, or a pH adjusting agent. However, practically, since many of the radioactive nuclides have plural chemical forms, all kinds of radioactive nuclides contained in the radioactive liquid waste are unlikely to be completely removed, even when the state (the pH or the like) of the radioactive liquid waste is adjusted to be one condition.

Here, the present inventors conducted intensive research on a method which can remove radioactive nuclides from the radioactive liquid waste using an adsorbent with high efficiency, even in a case where the kind and the concentration of the radioactive nuclide and the composition of the radioactive liquid waste are unclear. As a result of this research, the present inventors found that a method of removing radioactive nuclides contained in radioactive liquid waste by allowing the radioactive nuclides contained in the radioactive liquid waste to pass through an adsorbent layer so as to be removed by an adsorbent in the adsorbent layer, adding at least one chemical agent among an oxidizing agent, a reducing agent, and a pH adjusting agent to the radioactive liquid waste, and allowing the radioactive liquid waste, to which the chemical agent is added, to pass through the adsorbent layer again is an effective method of removing radioactive nuclides from radioactive liquid waste.

Ruthenium, which is one of the radioactive nuclides, will be described as an example. For example, it is known that Ru-106, which is a radioactive isotope of ruthenium, has plural oxidation numbers and plural chemical forms due to the properties of the radioactive liquid waste.

The present inventors acquired the removal rates of respective kinds of ruthenium which are contained in seawater with respective pH values and have different chemical forms by changing the pH of the seawater containing ruthenium to acidic (pH 2), neutral (pH 7), and alkaline (pH 12). Representative chemical forms of ruthenium contained in seawater with respective pH values described above and the removal rates of ruthenium, which are contained in seawater with respective pH values and have respective chemical forms, using an adsorbent, are shown in FIG. 2.

In neutral seawater, ruthenium is present mainly as a cation ($Ru(OH)_2^+$ or the like) and a neutral dissolved species ($Ru(OH)_4$ or the like) and the percentage of the neutral dissolved species which is unlikely to be removed by an adsorbent is approximately 74%. Meanwhile, in acidic (pH 2) seawater, approximately 58% of ruthenium is present as cations ($RuCl_2^+$ or the like), approximately 12% of ruthenium is present as anions ($RuCl_4^-$ or the like), and approximately 30% of ruthenium is present as the neutral dissolved species ($RuCl_3$ or the like). In alkaline seawater, approximately 100% of ruthenium is present as the neutral dissolved species ($Ru(OH)_4$).

Consequently, in order to remove ruthenium contained in the radioactive liquid waste using an adsorbent, it is preferable that ruthenium is adsorbed using an adsorbent, and then removed after the pH of the radioactive liquid waste is adjusted to acidic. In this case, approximately 30% of the neutral dissolved species contained in the acidic radioactive liquid waste cannot be removed by the adsorbent.

Accordingly, for example, first, in a case where a treatment of adsorbing ruthenium using an adsorbent is performed on the neutral radioactive liquid waste, 26% of cations ($Ru(OH)_2^+$) of ruthenium are removed. Thereafter, when the treatment of adsorbing ruthenium is performed by adjusting the pH of the radioactive liquid waste to acidic (for example, pH 2), approximately 22% (=74%×30%) of the neutral dissolved species remaining in the radioactive liquid waste can be reduced. Therefore, the neutral dissolved species which is contained in the radioactive liquid waste and is unlikely to be removed by an adsorbent can be reduced by adsorbing and removing ruthenium which can be removed from the radioactive liquid waste before the pH of the radioactive liquid waste is adjusted, adjusting the pH of the radioactive liquid waste to acidic (for example, pH 2), and performing a treatment of adsorbing ruthenium again.

Moreover, for example, in a case where the pH of the radioactive liquid waste is 2, approximately 30% of the neutral dissolved species remains in the radioactive liquid waste when the treatment of adsorbing ruthenium contained in the radioactive liquid waste is performed. In a case where the pH of the radioactive liquid waste is adjusted to pH 2 again and then the adsorption treatment is performed using an adsorbent, the percentage of the neutral dissolved species remaining in the radioactive liquid waste is decreased to 9% (=30%×30%).

In this manner, according to the above-described method of treating radioactive liquid waste which is newly found by the present inventors, the radioactive nuclides contained in the radioactive liquid waste can be efficiently removed using an adsorbent.

As the adsorbent, at least one of an ion exchange resin (a cation exchange resin or an anion exchange resin), a chelate resin, activated carbon, oxine impregnated activated carbon, zeolite, a titanic acid compound, a titanate compound, and ferrocyanide is used. These adsorbents can be suitably selected and then used according to each kind of radioactive nuclide to be adsorbed. In addition, examples of the oxidizing agent which can be used include hydrogen peroxide, ozone, an aqueous solution of permanganic acid and salts thereof, and an aqueous solution of hypochlorous acid and salts thereof.

Examples of the reducing agent which can be used include ascorbic acid, hydrazine, and oxalic acid. Examples of the pH adjusting agent include an acid solution of hydrochloric acid, nitric acid, sulfuric acid, or phosphoric acid and an alkali solution of sodium hydrogen carbonate, sodium carbonate, sodium hydroxide, or potassium hydroxide.

As a result of the above-described research, the present inventors found the second new knowledge that the radioactive nuclides contained in the radioactive liquid waste are removed by an adsorption device in the previous stage, at least one chemical agent from among an oxidizing agent, a reducing agent, and a pH adjusting agent is injected to the radioactive liquid waste discharged from the adsorption device in the previous stage, and ions of the radioactive nuclides which are generated in the radioactive liquid waste are removed by an adsorption device in the subsequent stage by allowing the radioactive liquid waste to pass through an adsorbent layer again through the injection of the chemical agent, and thus the removal efficiency of the radioactive nuclides contained in the radioactive liquid waste can be further improved.

Examples of the present invention will be described below.

Example 1

A method of treating radioactive liquid waste of Example 1 which is a preferred example of the present invention will be described with reference to FIG. 1. Further, a radioactive liquid waste treatment apparatus used for the method of treating the radioactive liquid waste will be described with reference to FIG. 1.

A radioactive liquid waste treatment apparatus 1 used in the present example includes a filtration device 2, a colloid removal device 3, and an adsorption device 5. The filtration device 2 is a device that physically filters particle components contained in the radioactive liquid waste and is provided in the inside of a cartridge filter (or a pleated filter) filled with filtering materials. The filtration device 2 removes particles which are contained in the radioactive liquid waste and have a particle diameter of approximately 1 μm or greater. The colloid removal device 3 is provided with a plurality of electrostatic filters 4 in a casing. The adsorption device 5 includes a plurality of adsorption towers 6. The respective adsorption towers 6 are respectively filled with adsorption materials selected according to the kind of the radioactive nuclide contained in the radioactive liquid waste. A radioactive liquid waste supply pipe 7 is connected to the filtration device 2. The filtration device 2 is connected to the colloid removal device 3 by a connection pipe 8. The adsorption tower 6 positioned on the most upstream side of the adsorption device 5 from among the plurality of adsorption towers 6 is connected to the colloid removal device 3 by the connection pipe 9. The respective adsorption towers 6 in the adsorption device 5 are sequentially connected to each other by a pipe 10. A discharge pipe 11 is connected to the adsorption tower 6 positioned on the most downstream side of the adsorption device 5 from among the plurality of adsorption towers 6.

As adsorption materials filling into the respective adsorption towers 6 of the adsorption device 5, in order to selectively adsorb radioactive cesium and radioactive strontium, for example, natural zeolite, artificial zeolite, or a silicotitanate is used. In order to selectively adsorb radioactive antimony or the like, for example, a hydrous cerium oxide-carrying adsorbent is used. In order to selectively adsorb radioactive heavy metals, for example, oxine impregnated activated carbon is used. These adsorption materials are respectively filled into the respective adsorption towers 6. As adsorption materials that adsorb radioactive nuclides used in the adsorption device 5, at least one of zeolite, ferrocyanide, a titanic acid compound, a titanate compound, an ion exchange resin, a chelate resin, activated carbon, and impregnated activated carbon is used.

The method of treating the radioactive liquid waste of the present example which uses the radioactive liquid waste treatment apparatus 1 will be described. In the method of treating the radioactive liquid waste of the present example, the radioactive liquid waste generated in a boiling water nuclear power plant is treated. The radioactive liquid waste that contains particles having a particle diameter of 1 μm or greater, negatively charged colloids, and two or more kinds of radioactive nuclides passes through the radioactive liquid waste supply pipe 7 and is supplied to the filtration device 2 by driving a pump (not illustrated) provided in the radioactive liquid waste supply pipe 7. The particles which are contained in the radioactive liquid waste and have a particle diameter of 1 μm or greater are removed by a cartridge filter in the filtration device 2. The radioactive liquid waste discharged from the filtration device 2 passes through the connection pipe 8 and is supplied to the colloid removal device 3.

The colloids contained in the radioactive liquid waste are removed by the respective electrostatic filters 4 in the colloid removal device 3. The fine particles having a particle diameter of less than 1 μm are referred to as colloids. The surface of colloids is positively or negatively charged. Whether the colloids are positively or negatively charged is determined by the substances forming the colloids and the surface structure thereof. Typically, colloids derived from soil components are most likely to be negatively charged. In the present example, since the respective electrostatic filters 4 in the colloid removal device 3 are positively charged when energized, the colloids derived from soil components, which are contained in the radioactive liquid waste and negatively charged, are removed by being attached to the surface of the respective electrostatic filters 4. It is not necessary to adjust the pH of the radioactive liquid waste to be supplied to the colloid removal device 3. The colloid particles having a particle diameter of approximately 1 nm to less than 1 μm are removed in the electrostatic filters 4.

The radioactive liquid waste from which colloid particles are removed passes through the connection pipe 9 and is supplied to the adsorption tower 6 of the adsorption device 5. The radioactive liquid waste supplied to the adsorption device 5 does not contain particle components and colloids. The radioactive nuclides such as radioactive cesium, radioactive strontium, and radioactive antimony, which are contained in the radioactive liquid waste, are in the form of ions. Each time when the radioactive liquid waste passes through the plurality of adsorption towers 6, respective radioactive nuclides such as radioactive cesium, radioactive strontium, and radioactive iodine contained in the radioactive liquid waste are adsorbed by adsorption materials respectively in the respective adsorption towers 6 and then removed. The respective adsorption towers 6 are filled with adsorption materials in an amount which can sufficiently adsorb the total amount of the respective radioactive nuclides contained in the radioactive liquid waste. For this reason, the concentrations of the respective radioactive nuclides contained in treated water discharged to the discharge pipe 11 from the adsorption device 5 are respectively less than or equal to the measurement lower limit. The treated water discharged from the adsorption device 5 passes through the discharge pipe 11, is supplied to a storage tank (not illustrated), and then preserved therein. When the concentrations of the respective radioactive nuclides contained in the treated water flowing in the discharge pipe 11 are measured using a radiation measuring machine (not illustrated) provided at the discharge pipe 11, the concentrations of the respective radioactive nuclides were respectively less than or equal to the measurement lower limit.

Since respective adsorption materials filled into the respective adsorption towers 6 of the adsorption device 5 have sufficient adsorption performance without the pH adjustment of treated water and the pH of the treated water discharged from the adsorption device 5 is in a neutral region (pH=6 to 8), the pH adjustment after the treatment is not necessary.

In order to verify the effects resulting from the method of treating the radioactive liquid waste of the present example, the amount of generation of the radioactive waste generated by the method of treating the radioactive liquid waste of the present example is evaluated. The amount of generation of the radioactive waste generated by the method of treating the radioactive liquid waste of the present example is shown in FIG. 2. For the comparison, the amount of generation of the waste generated by the method of treating the radioactive liquid waste that is carried out by adding a flocculating agent, which is a known example, is also evaluated and shown in FIG. 2. In the known example, the total amount of the radioactive waste respectively generated in a filtering process, an adsorbing process using an adsorption material, and a flocculating sedimentation process (generating sludge) that is performed by adding a flocculating agent becomes larger. Meanwhile, in the present example, the total amount of filtering materials (cartridge filter and the like) of the filtration device 2, waste filters of the respective electrostatic filters 4, and waste adsorption materials of the adsorption device 5 becomes less than or equal to ⅓ of the total amount of radioactive waste generated by the known method of treating radioactive waste that is performed by adding a flocculating agent, and thus the amount of radioactive waste to be generated is reduced.

According to the present example, with the simple apparatus configuration which has the filtration device 2, the colloid removal device 3 using the electrostatic filter 4, and the adsorption device 5, the amount of radioactive waste to be generated can be reduced and the radioactive nuclides can be removed to the extent that the concentration thereof becomes less than or equal to the measurement lower limit. The radioactive waste generated by the method of treating the radioactive liquid waste of the present example is formed of filtering materials of the filtration device 2, waste filters of the electrostatic filters, and waste adsorption materials of the adsorption device 5, precipitation is not generated, and the amount of radioactive waste to be generated can be reduced.

In a case where the radioactive liquid waste contains positively charged colloids as the colloids, a colloid removal device including an electrostatic filter which is negatively charged may be used in place of the colloid removal device 3.

Example 2

A method of treating radioactive liquid waste of Example 2 which is another preferred example of the present invention will be described with reference to FIG. 4. Further, a radioactive liquid waste treatment apparatus used for the method of treating the radioactive liquid waste will be described with reference to FIG. 4.

A radioactive liquid waste treatment apparatus 1A used in the present example has a configuration in which a colloid removal device 3A is added to the radioactive liquid waste treatment apparatus 1. The colloid removal device 3A is provided with a plurality of electrostatic filters 4A in a casing. The colloid removal device 3A is connected to the colloid removal device 3 by a connection pipe 8A and connected to the adsorption tower 6 positioned on the most upstream side of the adsorption device 5 by the connection pipe 9. Respective electrostatic filters 4A of the colloid removal device 3A are different from the electrostatic filters 4 of the colloid removal device 3 and are negatively charged when energized. Other configurations of the radioactive liquid waste treatment apparatus 1A are the same as those of the radioactive liquid waste treatment apparatus 1. The electrostatic filters 4 of the colloid removal device 3 are positively charged.

The method of treating the radioactive liquid waste of the present example which is performed using the radioactive liquid waste treatment apparatus 1A will be described in detail. In the method of treating the radioactive liquid waste of the present example, the radioactive liquid waste generated in a boiling water nuclear power plant is treated. Points different from those in Example 1 will be mainly described.

The radioactive liquid waste that contains particles having a particle diameter of 1 µm or greater, negatively charged colloids, positively charged colloids, and two or more kinds of radioactive nuclides passes through the radioactive liquid waste supply pipe 7 and is supplied to the filtration device 2 and further passes through the connection pipe 8 and is supplied to the colloid removal device 3. The particles having a particle diameter of 1 µm or greater and the negatively charged colloids are removed by the filtration device 2 and the colloid removal device 3. The radioactive liquid waste discharged from the colloid removal device 3 passes through the connection pipe 8A and is supplied to the colloid removal device 3A. The respective electrostatic filters 4A of the colloid removal device 3A are negatively charged. Accordingly, the positively charged colloids contained in the radioactive liquid waste are removed from the radioactive liquid waste by being attached to the respective electrostatic filters 4A which are negatively charged. The radioactive liquid waste discharged from the colloid removal, device 3A is supplied to the respective adsorption towers 6 of the adsorption device 5 and respective radioactive nuclides contained in the radioactive liquid waste are removed in the same manner as in Example 1.

In the present example, the respective effects generated in Example 1 can be also obtained. Further, in the present example, since the colloid removal device 3 provided with the electrostatic filters 4 which are positively charged and the colloid removal device 3A provided with electrostatic filters 4A which are negatively charged are used as colloid removal devices, it is possible to remove the negatively charged colloids and the positively charged colloids contained in the radioactive liquid waste and to decrease a load of the adsorption device 5 at the subsequent stage.

Example 3

A method of treating radioactive liquid waste of Example 3 which is another preferred example of the present invention will be described with reference to FIG. 5. Further, a radioactive liquid waste treatment apparatus used for the method of treating the radioactive liquid waste will be described with reference to FIG. 5.

A radioactive liquid waste treatment apparatus 1B has a configuration in which a radiation detector 12 and a bypass pipe 15 are added to the radioactive liquid waste treatment apparatus 1. An on-off valve 14 is provided in the connection pipe 9 and the radiation detector 12 is arranged on the side of the connection pipe 9 which is positioned on the upstream side of the on-off valve 14. One end portion of the bypass pipe 15 provided with an on-off valve 16 is connected to the connection pipe 9 between the colloid removal device 3 and the on-off valve 14. Another end of the bypass pipe 15 is connected to the discharge pipe 11. Other configurations of the radioactive liquid waste treatment apparatus 1B are the same as those of the radioactive liquid waste treatment apparatus 1.

The method of treating the radioactive liquid waste of the present example which is performed using the radioactive liquid waste treatment apparatus 1B will be described in detail. In the method of treating the radioactive liquid waste of the present example, the radioactive liquid waste generated in a boiling water nuclear power plant is treated. Points different from those in Example 1 will be mainly described.

The radioactive liquid waste that contains particles having a particle diameter of 1 µm or greater, negatively charged colloids, and two or more kinds of radioactive nuclides passes through the radioactive liquid waste supply pipe 7 and is supplied to the filtration device 2 and further supplied to the colloid removal device 3. The particles having a particle diameter of 1 µm or greater contained in the radioactive liquid waste are removed by the filtration device 2 and the negatively charged colloids are removed by the electrostatic filters 4 of the colloid removal device 3.

The radiation detector 12 measures the radioactivity concentration of the radioactive liquid waste which is discharged from the colloid removal device 3 and flows in the connection pipe 9, on the upstream side of the connection point between the connection pipe 9 and the bypass pipe 15. When the radioactivity concentration of the radioactive liquid waste measured by the radiation detector 12 is greater than the measurement lower limit of the radiation detector 12, the on-off valve 14 is open and the on-off valve 16 is closed, the radioactive liquid waste discharged from the colloid removal device 3 is supplied to the adsorption device 5, and then respective adsorption towers 6 of the adsorption device 5 respectively adsorb and remove each of the ionic radioactive nuclide contained in the radioactive liquid waste. The radioactivity concentration of treated water from which respective radioactive nuclides are removed by the adsorption device 5 and which is discharged to the discharge pipe 11 from the adsorption device 5 is decreased to less than or equal to the measurement lower limit of the radiation detector 12.

When the radioactivity concentration of the radioactive liquid waste flowing in the connection pipe 9, which is measured by the radiation detector 12, is less than or equal to the measurement lower limit of the radiation detector 12, the on-off valve 16 is open and the on-off valve 14 is closed. The radioactive liquid waste flowing in the connection pipe 9 passes through the bypass pipe 15 and is led to the discharge pipe 11. At this time, the radioactive liquid waste which flows in the connection pipe 9 and whose radioactivity concentration is less than or equal to the measurement lower limit is not supplied to the adsorption device 5.

Opening and closing of the on-off valves 14 and 16 based on the radioactivity concentration measured by the radiation detector 12 are performed manually or automatically. The manual opening and closing of the on-off valves 14 and 16 are performed by displaying the radioactivity concentration measured by the radiation detector 12 on a display device (not illustrated) and then opening and closing the on-off valves 14 and 16 is performed by an operator who has seen the displayed radioactivity concentration. The automatic opening and closing of the on-off valves 14 and 16 are performed by opening and closing the on-off valves 14 and 16 by a control device (not illustrated) that inputs the radioactivity concentration measured by the radiation detector 12.

The radiation detector 12 measures radiation (for example, alpha rays, beta rays, gamma rays, or X-rays) released by the radioactive nuclides contained in the radioactive liquid waste and examples of the radiation detector include an ionization chamber, a scintillation type detector, or a semiconductor detector. The radioactivity measured by the radiation detector 12 may be one kind or two or more kinds thereof.

In the present example, the respective effects generated in Example 1 can be also obtained. Further, since treated water is not supplied to the adsorption device 5 when the treated water does not contain ionic radioactive substances, recontamination of the treated water caused by elution of radioactive nuclides from adsorption materials in the respective adsorption towers 6 at the time of the treated water passing through the adsorption device 5 can be avoided, and degradation of performance of the adsorption materials can be reduced due to the avoidance of unnecessary water conduction.

In the radioactive liquid waste treatment apparatus 1B, the colloid removal device 2A is connected to the colloid removal device 2 by the connection pipe 8A in the same manner as that of the colloid removal device 2 in the radioactive liquid waste treatment apparatus 1A, and the connection pipe 9 may be provided in the colloid removal device 2A. In this case, the radiation detector 12 measures the radioactivity concentration of the radioactive liquid waste discharged from the colloid removal device 2A. When the measured radioactivity concentration is less than or equal to the measurement lower limit of the radiation detector 12, the on-off valve 16 is open and the on-off valve 14 is closed. When the measured radioactivity concentration is greater than the measurement lower limit, the on-off valve 14 is open and the on-off valve 16 is closed.

The respective methods of treating radioactive liquid waste of Examples 1 to 3 can be applied to a treatment of radioactive liquid waste generated in a pressurized-water nuclear power plant.

Examples 4 and 5, which are other examples of the present invention, reflecting the above-described first new knowledge obtained by the present inventors will be described below.

Example 4

A method of treating radioactive liquid waste of Example 4 which is another preferred example of the present invention based on the above-described knowledge will be described with reference to FIG. 6. Further, a radioactive liquid waste treatment apparatus used for the method of treating the radioactive liquid waste will be described with reference to FIG. 6.

A radioactive liquid waste treatment apparatus 1C used in the present example includes a filtration device 2, a colloid removal device 3, an adsorption device (first adsorption device) 5, and an adsorption tower (second adsorption device) 13. The filtration device 2 is a device that physically filters particle components contained in the radioactive liquid waste and is provided in the inside of a cartridge filter (or a pleated filter) filled with filtering materials. The filtration device 2 removes particles which are contained in the radioactive liquid waste and have a particle diameter of approximately 1 μm or greater. The colloid removal device 3 is provided with a plurality of electrostatic filters 4 in a casing. The adsorption device 5 includes a plurality of adsorption towers 6. The respective adsorption towers 6 are respectively filled with adsorbents selected according to the kind of the radioactive nuclide contained in the radioactive liquid waste. A radioactive liquid waste supply pipe 7 is connected to the filtration device 2. The filtration device 2 is connected to the colloid removal device 3 by a connection pipe 8. The adsorption tower 6 positioned on the most upstream side of the adsorption device 5 from among the plurality of adsorption towers 6 is connected to the colloid removal device 3 by the connection pipe 9. The respective adsorption towers 6 in the adsorption device 5 are sequentially connected to each other by a pipe 10. An adsorption tower 13 that is arranged on the downstream side of the adsorption device 5 and filled with oxine impregnated activated carbon is connected to the adsorption tower 6 positioned on the most downstream side of the adsorption device 5 by a pipe 17. The oxine impregnated activated carbon is an adsorbent carried by the surface of activated carbon in which an oxine group is a carrier. The discharge pipe 11 is connected to the adsorption tower 13.

As adsorbents filling into the respective adsorption towers 6 of the adsorption device 5, in order to selectively adsorb radioactive cesium and radioactive strontium, for example, natural zeolite, artificial zeolite, or a silicotitanate is used. In order to selectively adsorb radioactive antimony or the like, for example, a hydrous cerium oxide-carrying adsorbent is used. In order to selectively adsorb radioactive heavy metals, for example, oxine impregnated activated carbon is used. These adsorbents are respectively filled into the respective adsorption towers 6. As adsorbents that adsorb radioactive nuclides used in the adsorption device 5, at least one of zeolite, ferrocyanide, a titanic acid compound, a titanate compound, an ion exchange resin, a chelate resin, activated carbon, and impregnated activated carbon is selected. Here, in the present example, as described above, the adsorption tower 13 filled with oxine impregnated activated carbon is arranged on the downstream side of the adsorption device 5.

The method of treating the radioactive liquid waste of the present example which uses the radioactive liquid waste treatment apparatus 1C will be described.

Particles which are contained in the radioactive liquid waste and have a particle diameter of 1 μm or greater are removed by the cartridge filter in the filtration device 2. The radioactive liquid waste discharged from the filtration device 2 passes through the connection pipe 8 and is supplied to the colloid removal device 3.

The colloids contained in the radioactive liquid waste are removed by the respective electrostatic filters 4 in the colloid removal device 3. The fine particles having a particle diameter of less than 1 μm are referred to as colloids. Since colloids contain radioactive nuclides (radioactive cesium, radioactive strontium, and radioactive antimony), when the colloids are removed by respective electrostatic filters 4, the radioactive nuclides contained in the colloids are also removed. The surface of colloids are positively or negatively charged. Whether the colloids are positively or negatively charged is determined by the substances forming the colloids and the surface structure thereof. For example, colloids derived from soil components are most likely to be negatively charged. In the present example, the respective electrostatic filters 4 in the colloid removal device 3 which are positively charged are used, and the colloids which are contained in the radioactive liquid waste and negatively charged are removed by being attached to the surface of the respective electrostatic filters 4. It is not necessary to adjust the pH of the radioactive liquid waste to be supplied to the colloid removal device 3. The colloid particles having a particle diameter of approximately 1 nm to less than 1 μm are removed in the electrostatic filters 4.

The radioactive liquid waste from which colloid particles are removed passes through the connection pipe 9 and is supplied to the adsorption tower 6 of the adsorption device 5. The radioactive liquid waste supplied to the adsorption device 5 does not contain particle components and colloids. The radioactive nuclides such as radioactive cesium, radioactive strontium, and radioactive antimony, which are contained in the radioactive liquid waste, are in the form of ions. Each time when the radioactive liquid waste passes through the plurality of adsorption towers 6, respective radioactive nuclides such as radioactive cesium, radioactive strontium, and radioactive iodine contained in the radioactive liquid waste are adsorbed by adsorbents respectively in the respective adsorption towers 6 and then removed.

The transition metal ions such as cobalt and metal element ions of rare earth such as column end and cesium remaining in the radioactive liquid waste discharged from the adsorption device 5 are removed by being adsorbed to oxine impregnated activated carbon in the adsorption tower 13, and the pH of the radioactive liquid waste in the adsorption tower 13 is adjusted to neutral (the pH is in a range of 4 to 9). The pH of treated water discharged to the discharge pipe 11 from the adsorption tower 13 is adjusted to neutral (the pH is in a range of 4 to 9). The respective adsorption towers 6 of the adsorption device 5 are filled with adsorbents in an amount which can sufficiently adsorb the total amount of the respective radioactive nuclides contained in the radioactive liquid waste. For this reason, the concentrations of the respective radioactive nuclides contained in treated water discharged to the discharge pipe 11 from the adsorption tower 13 are respectively less than or equal to the measurement lower limit. The treated water discharged from the adsorption device 5 passes through the discharge pipe 11, is supplied to a storage tank (not illustrated), and then preserved therein.

According to the present example, with the simple apparatus configuration which has the filtration device 2, the colloid removal device 3 using the electrostatic filter 4, and the adsorption device 5, the amount of radioactive waste to be generated can be reduced and the radioactive nuclides can be removed to the extent that the concentration thereof becomes less than or equal to the measurement lower limit. In addition, by arranging the adsorption tower 13 filled with oxine impregnated activated carbon on the downstream side of the adsorption device 5, the pH of the radioactive liquid waste can be adjusted to be in a range of 4 to 9 without specially adding a chemical agent that adjusts the pH to the radioactive liquid waste.

Example 5

A method of treating radioactive liquid waste of Example 5, which is another preferred example of the present invention, formed by reflecting the first new knowledge obtained by the present inventors to Example 4 described above will be described with reference to FIG. 7.

A radioactive liquid waste treatment apparatus 1D used for the method of treating the radioactive liquid waste of the present invention has a configuration in which an adjustment tank (liquid adjusting unit) 18, a pH adjusting agent supply device 19, and an adsorption device 5B are added to the radioactive liquid waste treatment apparatus 1C used for the method of treating the radioactive liquid waste of Example 4. Other configurations of the radioactive liquid waste treatment apparatus 1D are the same as those of the radioactive liquid waste treatment apparatus 1C.

The configurations of the radioactive liquid waste treatment apparatus 1D which are different from those of the radioactive liquid waste treatment apparatus 1C will be described. The adjustment tank 18 provided with a stirring device (not illustrated) therein is connected to the adsorption tower 6, positioned on the most downstream side of the adsorption device 5, by a pipe 22. The pH adjusting agent supply device 19 includes a pH adjusting agent tank 20 and a pH adjusting agent supply pipe 21, and the pH adjusting agent tank 20 is connected to the adjustment tank 18 by the pH adjusting agent supply pipe 21 provided with an on-off valve (not illustrated). In the present example, the pH adjusting agent tank 20 is filled with a hydrochloric acid aqueous solution which is a pH adjusting agent.

The adsorption device 5B includes a plurality of adsorption towers 6B. The respective adsorption towers 6B are respectively filled with adsorbents selected according to the kind of the radioactive nuclide contained in the radioactive liquid waste. A pipe 23 connected to the adjustment tank 18 is connected to the adsorption tower 6B positioned on the most upstream side of the adsorption device 5B. The respective adsorption towers 6B in the adsorption device 5B are sequentially connected to each other by a pipe 10B.

An adsorption tower 13 that is filled with oxine impregnated activated carbon is arranged on the downstream side of the adsorption device 5B and is connected to the adsorption tower 6B positioned on the most downstream side of the adsorption device 5B by the pipe 17. The discharge pipe 11 is connected to the adsorption tower 13.

The respective adsorbent layers in the respective adsorption towers 6B are filled with respective adsorbents selected according to each kind of radioactive nuclide removed by adsorption. In order to selectively adsorb radioactive cesium and radioactive strontium, for example, natural zeolite, artificial zeolite, or a silicotitanate is used. In order to selectively adsorb radioactive antimony or the like, for example, a hydrous cerium oxide-carrying adsorbent is used. In addition, an adsorbent layer of an adsorption tower 2A is filled with an ion exchange resin (a cation exchange resin and an anion exchange resin).

The method of treating the radioactive liquid waste of the present example which uses the radioactive liquid waste treatment apparatus 1D will be described. In the method of treating the radioactive liquid waste of the present example, the radioactive liquid waste generated in a boiling water nuclear power plant is treated. The radioactive liquid waste contains one or plural kinds of radioactive nuclides from among transition metals such as ruthenium, technetium, and niobium; alkali metals such as cesium; alkaline earth metals such as strontium; metal elements, for example, rare earth such as cerium; antimony; tellurium; halogen such as iodine; and non-metallic elements such as carbon and boron.

The radioactive liquid waste containing plural radioactive nuclides are sequentially supplied to the filtration device 2 and the colloid removal device 3 in the same manner as in Example 4. Particles which are contained in the radioactive liquid waste and have a particle diameter of 1 μm or greater are removed by the filtration device 2. Thereafter, when the radioactive liquid waste discharged from the filtration device 2 flows in the respective adsorption towers 6 of the adsorption device 5, adsorbents in the respective adsorption towers 6 adsorb and remove cations and anions of the radioactive nuclides such as ruthenium contained in the radioactive liquid waste according to the kind of adsorbent in the adsorbent layer. The radioactive nuclides which are not adsorbed and removed by the adsorbents in the respective adsorption towers 6 flow in the pipe 22 together with the radioactive liquid waste and are led to the adjustment tank 18.

In a case where the pH of the radioactive liquid waste supplied to the adsorption device 5 is 7, ruthenium which is a kind of radioactive nuclide is present as cations ($Ru(OH)_2^+$ or the like) or a neutral dissolved species ($Ru(OH)_4$ or the like) in the radioactive liquid waste. The cations ($Ru(OH)_2^+$ or the like) of ruthenium are adsorbed and removed in the corresponding adsorption tower 6 while the radioactive liquid waste flows in the adsorption device 5. The neutral dissolved species ($Ru(OH)_4$ or the like) of ruthenium is not removed by the adsorption device 5 and flows in the adjustment tank 18.

A hydrochloric acid aqueous solution in the pH adjusting agent tank 20 passes through the pH adjusting agent supply pipe 21 and is injected to the radioactive liquid waste in the adjustment tank 18. The radioactive liquid waste in which ozone is dissolved and the hydrochloric acid aqueous solution are mixed with each other by the above-described stirring device in the adjustment tank 18. The neutral dissolved species ($Ru(OH)_4$) of ruthenium which has not been converted into cations of ruthenium even when ozone gas is injected is converted into cations of ruthenium ($RuCl_2^+$ or the like), anions of ruthenium ($RuCl_4^-$ or the like), and the neutral dissolved species ($RuCl_3$ or the like) of ruthenium by adjusting the pH of the radioactive liquid waste to acidic (for example, pH 2) through injection of a hydrochloric acid aqueous solution. The radioactive nuclides other than ruthenium contained in the radioactive liquid waste are converted into cations and anions.

The radioactive liquid waste containing cations of ruthenium ($RuCl_2^+$ or the like), anions of ruthenium ($RuCl_4^-$ or the like), and the neutral dissolved species ($RuCl_3$ or the like) of ruthenium which are generated in the adjustment tank 18; and cations, anions, and the neutral dissolved species of the radioactive nuclides other than ruthenium passes through the pipe 23 and is supplied to the adsorption tower 6B positioned on the most upstream side of the adsorption device 5B. In addition, the radioactive liquid waste passes through the pipe 10B and is sequentially supplied to respective other adsorption towers 6B of the adsorption device. Cations ($RuCl_2^+$ or the like) of trivalent ruthenium, anions of ruthenium ($RuCl_4^-$ or the like) and cations and anions of the radioactive nuclides other than ruthenium are adsorbed and removed by an adsorbent in the corresponding adsorption tower 6B. The radioactive liquid waste containing the neutral dissolved species ($RuCl_3$ or the like) of ruthenium which has not been removed in the respective adsorption towers 6B of the adsorption device 5B and the radioactive nuclides other than ruthenium passes through the adsorption tower 13 filled with oxine impregnated activated carbon and is discharged to the discharge pipe 11 from the adsorption device 5B.

The pH adjusting agent aqueous solution may or may not be added to the radioactive liquid waste in the adjustment tank 18 as needed.

In the present example, an example in which a pH adjusting agent is added to the radioactive liquid waste has been described, but at least one of an oxidizing agent, a reducing agent, and a pH adjusting agent may be used as a chemical agent to be added to the radioactive liquid waste. Further, for example, in a case where an oxidizing agent and a reducing agent are added to the radioactive liquid waste in the adjustment tank 18, an oxidizing agent supply device including an oxidizing agent supply pipe provided with an oxidizing agent tank and an on-off valve and a reducing agent supply device including a reducing agent supply pipe provided with a reducing agent tank and an on-off valve may be respectively connected to the adjustment tank 18 similar to the case of the pH adjusting agent.

In the present example, the respective effects generated in Example 4 can be also obtained. Further, in the present example, ions (cations and anions) of the radioactive nuclides such as ruthenium contained in the radioactive liquid waste are removed using the adsorption device 5, and the neutral dissolved species of the radioactive nuclides such as ruthenium can be changed into cations and anions by injecting hydrochloric acid, which is a pH adjusting agent, to the radioactive liquid waste containing the neutral dissolved species of the radioactive nuclides such as ruthenium in the adjustment tank 18 and adjusting the pH of the radioactive liquid waste to, for example, acidic. For this reason, the cations and anions of the radioactive nuclides such as ruthenium which are generated from the neutral dissolved species can be removed by adsorption in the adsorption device 5B. Therefore, the radioactive nuclides contained in the radioactive liquid waste can be further reduced. In the present example, the removal efficiency of the radioactive nuclides contained in the radioactive liquid waste can be further improved.

Examples 6 to 9, which are examples of the present invention, reflecting the above-described second new knowledge obtained by the present inventors will be described below.

Example 6

A method of treating radioactive liquid waste of Example 6 which is another preferred example of the present invention will be described with reference to FIG. 8.

A radioactive liquid waste treatment apparatus 29 used for the method of treating the radioactive liquid waste of the present example will be described with reference to FIG. 8. The radioactive liquid waste treatment apparatus 29 includes adsorption devices 32 and 40, an adjustment tank (liquid adjusting unit) 34, an oxidizing agent supply device 35, and a pH adjusting agent supply device 37.

The adsorption device 32 includes a plurality of adsorption towers 32A. The respective adsorption towers 32A are respectively filled with adsorbents selected according to the kind of the radioactive nuclide contained in the radioactive liquid waste. A radioactive liquid waste supply pipe 30 is connected to the adsorption tower 32A positioned on the most upstream side of the adsorption device 32. The respective adsorption towers 32A in the adsorption device 32 are sequentially connected to each other by a pipe 31. The adsorption tower 32A positioned on the most downstream side of the adsorption device 32 is connected to the adjustment tank 34 by a pipe 33.

The oxidizing agent supply device 35 includes an oxidizing agent tank 41 and an oxidizing agent supply pipe 36, and the oxidizing agent tank 41 is connected to the adjustment tank 34 by the oxidizing agent supply pipe 36 provided with an on-off valve (not illustrated). The pH adjusting agent supply device 37 includes a pH adjusting agent tank 43 and a pH adjusting agent supply pipe 38, and the pH adjusting agent tank 43 is connected to the adjustment tank 34 by the pH adjusting agent supply pipe 38 provided with an on-off valve (not illustrated). In the present example, the oxidizing agent tank 41 is filled with ozone gas which is an oxidizing agent and the pH adjusting agent tank 43 is filled with a hydrochloric acid aqueous solution which is a pH adjusting agent.

The adsorption device 40 includes a plurality of adsorption towers 40A. The respective adsorption towers 40A are respectively filled with adsorbents selected according to the kind of the radioactive nuclide contained in the radioactive liquid waste. A pipe 39 connected to the adjustment tank 34 is connected to the adsorption tower 40A positioned on the most upstream side of the adsorption device 40. The respective adsorption towers 40A in the adsorption device 40 are sequentially connected to each other by a pipe 42. The discharge pipe 11 is connected to the adsorption tower 40A positioned on the most downstream side of the adsorption device 40.

The respective adsorbent layers in the respective adsorption towers 32A and the respective adsorption towers 40A are filled with respective adsorbents selected according to each kind of radioactive nuclide removed by adsorption. In order to selectively adsorb radioactive cesium and radioactive strontium, for example, natural zeolite, artificial zeolite, or a silicotitanate is used. In order to selectively adsorb radioactive antimony or the like, for example, a hydrous cerium oxide-carrying adsorbent is used. In addition, an adsorbent layer of an adsorption tower 32A is filled with an ion exchange resin (a cation exchange resin and an anion exchange resin).

The method of treating the radioactive liquid waste of the present example which uses the radioactive liquid waste treatment apparatus 29 will be described. In the method of treating the radioactive liquid waste of the present example, the radioactive liquid waste generated in a boiling water nuclear power plant is treated. The radioactive liquid waste contains one or plural kinds of radioactive nuclides from among transition metals such as ruthenium, technetium, and niobium; alkali metals such as cesium; alkaline earth metals such as strontium; metal elements, for example, rare earth such as cerium; antimony; tellurium; halogen such as iodine; and non-metallic elements such as carbon and boron.

The radioactive liquid waste containing plural radioactive nuclides passes through the radioactive liquid waste supply pipe 30 by driving a pump (not illustrated) provided in the radioactive liquid waste supply pipe 30 and is supplied to the adsorption tower 32A positioned on the most upstream side of the adsorption device 32. Thereafter, the radioactive liquid waste passes through the pipe 31 and is sequentially supplied to the respective adsorption towers 32 positioned on the downstream side. When the radioactive liquid waste flows in the respective adsorption towers 32A, adsorbents in the respective adsorption towers 32A adsorb and remove cations of the radioactive nuclides and anions of the radioactive nuclides contained in the radioactive liquid waste according to the kind of adsorbent in the adsorbent layer. The radioactive nuclides which are not adsorbed and removed by the adsorbents in the respective adsorption towers 32A flow in the pipe 33 together with the radioactive liquid waste and are led to the adjustment tank 34.

In a case where the pH of the radioactive liquid waste supplied to the adsorption device 32 from the radioactive liquid waste supply pipe 30 is 7, ruthenium which is a kind of radioactive nuclide is present as cations ($Ru(OH)_2^+$ or the like) or a neutral dissolved species ($Ru(OH)_4$ or the like) in the radioactive liquid waste. The cations ($Ru(OH)_2^+$ or the like) of ruthenium are adsorbed and removed in the corresponding adsorption tower 32A while the radioactive liquid waste flows in the adsorption device 32. The neutral dissolved species ($Ru(OH)_4$ or the like) of ruthenium is not removed by the adsorption device 32 and flows in the adjustment tank 34.

Ozone gas in the oxidizing agent tank 41 passes through the oxidizing agent supply pipe 36 and is injected to the radioactive liquid waste in the adjustment tank 34. The injected ozone gas and the radioactive liquid waste are mixed with each other in the adjustment tank 34 by a stirring device (not illustrated) provided in the adjustment tank 34. Due to the injection of the ozone gas, since tetravalent ruthenium of the neutral dissolved species ($Ru(OH)_4$) contained in the radioactive liquid waste becomes trivalent ruthenium, the neutral dissolved species ($Ru(OH)_4$) of ruthenium becomes cations of ruthenium. Moreover, a hydrochloric acid aqueous solution in the pH adjusting agent tank 43 passes through the pH adjusting agent supply pipe 38 and is injected to the radioactive liquid waste in the adjustment tank 34. The radioactive liquid waste in which ozone is dissolved and the hydrochloric acid aqueous solution are mixed with each other by the above-described stirring device in the adjustment tank 34. The neutral dissolved species ($Ru(OH)_4$) of ruthenium which has not been converted into cations of ruthenium even when ozone gas is injected is converted into cations of ruthenium ($RuCl_2^+$ or the like), anions of ruthenium ($RuCl_4^-$ or the like), and the neutral dissolved species ($RuCl_3$ or the like) of ruthenium by adjusting the pH of the radioactive liquid waste to acidic (for example, pH 2) through injection of a hydrochloric acid aqueous solution. The radioactive nuclides other than ruthenium contained in the radioactive liquid waste are converted into cations and anions.

The radioactive liquid waste containing cations of trivalent ruthenium ($RuCl_2^+$ or the like), anions of ruthenium ($RuCl_4^-$ or the like), and the neutral dissolved species ($RuCl_3$ or the like) of ruthenium which are generated in the adjustment tank 34; and cations, anions, and the neutral dissolved species of the radioactive nuclides other than ruthenium passes through the pipe 39 and is supplied to the adsorption tower 40A positioned on the most upstream side of the adsorption device 40. In addition, the radioactive liquid waste passes through the pipe 42 and is sequentially supplied to respective other adsorption towers 40A of the adsorption device. Cations ($RuCl_2^+$ or the like) of trivalent ruthenium, anions of ruthenium ($RuCl_4^-$ or the like) and cations and anions of the radioactive nuclides other than ruthenium are adsorbed and removed by an adsorbent in the corresponding adsorption tower 40A. The radioactive liquid waste containing the neutral dissolved species ($RuCl_3$ or the like) of ruthenium which has not been removed in the respective adsorption towers 40A of the adsorption device 40 and the radioactive nuclides other than ruthenium is discharged to the discharge pipe 11 from the adsorption device 40. The treated water discharged from the adsorption device 40 passes through the discharge pipe 11, is supplied to the storage tank (not illustrated), and then preserved.

The pH adjusting agent aqueous solution may or may not be added to the radioactive liquid waste in the adjustment tank 34 as needed.

In the present example, an example in which an oxidizing agent and a pH adjusting agent is added to the radioactive liquid waste has been described, but at least one of an oxidizing agent, a reducing agent, and a pH adjusting agent may be used as a chemical agent to be added to the radioactive liquid waste. Further, for example, in a case where a reducing agent is added to the radioactive liquid waste in the adjustment tank 34, a reducing agent supply device including a reducing agent supply pipe provided with a reducing agent tank and an on-off valve may be connected to the adjustment tank 34 similar to the case of the oxidizing agent and the pH adjusting agent.

In the present example, ions (cations and anions) of the radioactive nuclides such as ruthenium contained in the radioactive liquid waste are removed using the adsorption device 32, and ozone which is an oxidizing agent and hydrochloric acid which is a pH adjusting agent are injected to the radioactive liquid waste containing the neutral dissolved species of the radioactive nuclides such as ruthenium in the adjustment tank 34. Subsequently, the neutral dissolved species of the radioactive nuclides such as ruthenium becomes cations by changing the valence thereof and the neutral dissolved species of the radioactive nuclides such as ruthenium can be changed to cations and anions by adjusting the pH of the radioactive liquid waste to, for example, acidic. For this reason, the cations and anions of the radioactive nuclides such as ruthenium which are generated from the neutral dissolved species can be removed by adsorption in the adsorption device 40. Therefore, the radioactive nuclides contained in the radioactive liquid waste can be further reduced. In the present example, the removal efficiency of the radioactive nuclides contained in the radioactive liquid waste can be further improved.

Even in a case where a pH adjusting agent is injected to the radioactive liquid waste in the adjustment tank 34 and an oxidizing agent is not injected in the present example, since the cations and anions of the radioactive nuclides such as ruthenium which are generated in the radioactive liquid waste can be removed using the adsorption device 40 due to the injection of the pH adjusting agent, the removal efficiency of the radioactive nuclides contained in the radioactive liquid waste can be further improved.

Example 7

A method of treating radioactive liquid waste of Example 7 which is another preferred example of the present invention will be described with reference to FIG. 9.

A radioactive liquid waste treatment apparatus 29A used for the method of treating the radioactive liquid waste of the present example has a configuration in which the adjustment tank 34 is replaced by a liquid adjusting unit 34A in the radioactive liquid waste treatment apparatus 29 used for the method of treating the radioactive liquid waste of Example 6. Other configurations of the radioactive liquid waste treatment apparatus 29A are the same as those of the radioactive liquid waste treatment apparatus 29. The oxidizing agent supply pipe 36 in the oxidizing agent supply device 35 including the oxidizing agent tank 41 and the oxidizing agent supply pipe 36 and the pH adjusting agent supply pipe 38 in the pH adjusting agent supply device 37 including the pH adjusting agent tank 43 and the pH adjusting agent supply pipe 38 are connected to the liquid adjusting unit 34A. In addition, the pipes 33 and 39 are connected to the liquid adjusting unit 34A. The liquid adjusting unit 34A has a structure in which an oxidizing agent aqueous solution and a pH adjusting agent aqueous solution injected during the process of the radioactive liquid waste flowing in the liquid adjusting unit 34A can be mixed with the radioactive liquid waste using, for example, a static mixer.

The method of treating the radioactive liquid waste of the present example which uses the radioactive liquid waste treatment apparatus 29A will be described. In the same manner as in Example 6, the radioactive liquid waste containing radioactive nuclides such as ruthenium, generated in a boiling water nuclear power plant is supplied to the adsorption device 32 and the cations and anions of the radioactive nuclides such as ruthenium which are contained in the radioactive liquid waste are adsorbed and removed by an adsorbent in the corresponding adsorption tower 32A of the adsorption device. The radioactive liquid waste which is discharged from the adsorption device 32 and contains the neutral dissolved species of the radioactive nuclides such as ruthenium passes through the pipe 33 and is led to the liquid adjusting unit 34A. As in the same manner as in Example 6, ozone gas in the oxidizing agent tank 41 and a hydrochloric acid aqueous solution in the pH adjusting agent tank 43 are injected to the radioactive liquid waste in the liquid adjusting unit 34A. Due to the injection of the ozone gas and the hydrochloric acid aqueous solution, the neutral dissolved species of the radioactive nuclides such as ruthenium, which is contained in the radioactive liquid waste, becomes cations and anions in the same manner as in Example 6. These cations and anions are adsorbed and removed in the corresponding adsorption tower 40A of the adsorption device 40.

In the present example, the effects generated in Example 6 can be obtained. Further, in the present example, the radioactive liquid waste treatment apparatus 29A can be more simplified than the radioactive liquid waste treatment apparatus 29 by means of using the liquid adjusting unit 34A.

Example 8

A method of treating radioactive liquid waste of Example 8 which is another preferred example of the present invention will be described with reference to FIG. 10.

A radioactive liquid waste treatment apparatus 29B used for the method of treating the radioactive liquid waste of the present example has a configuration in which the adsorption device 40 is removed from the radioactive liquid waste treatment apparatus 29 used for the method of treating the radioactive liquid waste of Example 6, a changeover valve 45 is provided in the discharge pipe 11 connected to the adjustment tank 44, a changeover valve 44 is provided in the radioactive liquid waste supply pipe 30, and the changeover valve 45 and the changeover valve 44 are connected to each other by return pipes 46A and 46B. The return pipe 46A connected to the changeover valve 45 is connected to the upper end portion of a liquid waste storage tank 47, and the return pipe 46B connected to the bottom portion of the liquid waste storage tank 47 and provided with a pump 48 is connected to the changeover valve 44. The return pipes 46A and 46B, the liquid waste storage tank 47, and the pump 48 which connect the changeover valve 45 with the changeover valve 44 are radioactive liquid waste supply devices that supply the radioactive liquid waste in the adjustment tank 34 to the adsorption device 32. Other configurations of the radioactive liquid waste treatment apparatus 29B are the same as those of the radioactive liquid waste treatment apparatus 29.

The method of treating the radioactive liquid waste of the present example which is performed using the radioactive liquid waste treatment apparatus 29B will be described. When the radioactive liquid waste containing radioactive nuclides such as ruthenium which is generated in a boiling water nuclear power plant is treated in the radioactive liquid waste treatment apparatus 29B, first, the changeover valve 44 is operated such that the radioactive liquid waste supply pipe 30 is connected to the adsorption device 32 and the radioactive liquid waste supply pipe 30 is not connected to the return pipe 46B. The changeover valve 45 is operated such that the discharge pipe 11 is connected to the return pipe 46A.

In the same manner as in Example 6, the radioactive liquid waste containing radioactive nuclides such as ruthenium, generated in a boiling water nuclear power plant is supplied to the adsorption device 32 and the cations and anions of the radioactive nuclides such as ruthenium which are contained in the radioactive liquid waste are adsorbed and removed by an adsorbent in the corresponding adsorption tower 32A of the adsorption device 32. The radioactive liquid waste which is discharged from the adsorption device 32 and contains the neutral dissolved species of the radioactive nuclides such as ruthenium passes through the pipe 33 and is led to the adjustment tank 34. As in the same manner as in Example 1, ozone gas in the oxidizing agent tank 41 and a hydrochloric acid aqueous solution in the pH adjusting agent tank 43 are injected to the radioactive liquid waste in the adjustment tank 34. Due to the injection of the ozone gas and the hydrochloric acid aqueous solution, the neutral dissolved species of the radioactive nuclides such as ruthenium, which is contained in the radioactive liquid waste, becomes cations and anions in the same manner as in Example 6. The radioactive liquid waste discharged from the adjustment tank 34 passes through the discharge pipe 11 and the return pipe 46A and is supplied to the liquid waste storage tank 47. The radioactive liquid waste containing cations and anions generated in the adjustment tank 34 is supplied to the liquid waste storage tank 47 to the extent that the liquid waste storage tank 47 becomes almost full of the radioactive liquid waste. An on-off valve (not illustrated) provided in an air discharge pipe (not illustrated) connected to the top of the liquid waste storage tank 47 is open so as to facilitate the supply of the radioactive liquid waste to the liquid waste storage tank 47. The water level of the radioactive liquid waste in the liquid waste storage tank 47 can be known by measuring the level using a water level gauge (not illustrated) provided in the liquid waste storage tank 47.

When the water level of the radioactive liquid waste in the liquid waste storage tank 47 is increased up to a predetermined water level, the supply of the radioactive liquid waste to the adsorption device 32 after passing through the radioactive liquid waste supply pipe 30 is stopped. Thereafter, the changeover valve 44 is operated such that the return pipe 46B is connected to the adsorption device 32, and the changeover valve 45 is operated such that the discharge pipe 11 is not connected to the return pipe 46A. In addition, the pump 48 provided in the return pipe 46B is driven so that the radioactive liquid waste in the liquid waste storage tank 47 is supplied to the adsorption device 32. The cations and anions of the radioactive nuclides such as ruthenium which are contained in the radioactive liquid waste in the liquid waste storage tank 47 are adsorbed and removed by an adsorbent in the corresponding adsorption tower 32A of the adsorption device 32. The cations and anions of the radioactive nuclides such as ruthenium are discharged to the discharge pipe 11 from the adsorption device 32. The discharged radioactive liquid waste is not led to the return pipe 46A.

In the present example, the effects generated in Example 6 can be obtained. Further, in the present example, since the adsorption device 40 becomes unnecessary, the radioactive liquid waste treatment apparatus 29B can be more simplified than the radioactive liquid waste treatment apparatus 29.

In the present example, the adjustment tank 4 may be replaced by the liquid adjusting unit 4A.

Example 9

A method of treating radioactive liquid waste of Example 9 which is another preferred example of the present invention will be described with reference to FIG. 11.

A radioactive liquid waste treatment apparatus 29C used for the method of treating the radioactive liquid waste of the present example has a configuration in which a measuring device 49 is provided in the adjustment tank 34 in the radioactive liquid waste treatment apparatus 29B used for the method of treating the radioactive liquid waste of Example 9. The measuring device 49 is a measuring device for measuring any of the radioactivity concentration, the pH, the oxidation-reduction potential, the oxidizing agent concentration, and the reducing agent concentration of the radioactive liquid waste. In the present example, the measuring device 49 measures the pH of the radioactive liquid waste. Other configurations of the radioactive liquid waste treatment apparatus 29C are the same as those of the radioactive liquid waste treatment apparatus 29B.

The method of treating the radioactive liquid waste of the present example which is performed using the radioactive liquid waste treatment apparatus 29C will be described. The radioactive liquid waste containing radioactive nuclides such as ruthenium which is generated in a boiling water nuclear power plant is treated in the same manner as in Example 8. In the present example, the pH of the radioactive liquid waste in the adjustment tank 34 is measured by the measuring device 49. The opening of an on-off valve provided in the pH adjusting agent supply pipe 38 is adjusted and the amount of a hydrochloric acid aqueous solution to be injected to the adjustment tank 34 is adjusted based on the measured pH value. Moreover, the oxidation-reduction potential of the radioactive liquid waste in the adjustment tank 34 is measured by another measuring device 49. The opening of an on-off valve provided in the oxidizing agent supply pipe 36 is adjusted and the amount of ozone gas to be injected to the adjustment tank 34 is adjusted based on the measured value of the oxidation-reduction potential. In this manner, the respective amounts of the hydrochloric acid aqueous solution and the ozone gas to be respectively injected to the radioactive liquid waste can be appropriately controlled by measuring the pH and the oxidation-reduction potential of the radioactive liquid waste. The similar controlling can be performed by providing the measuring device 49 in the pipe 33.

In the present example, the respective effects generated in Example 8 can be obtained. Further, in the present example, since the pH and the oxidation-reduction potential of the radioactive solution are measured, the respective amounts of the hydrochloric acid aqueous solution and the ozone gas to be respectively injected to the radioactive liquid waste can be appropriately controlled.

The pH and the oxidation-reduction potential of the radioactive liquid waste may be measured by performing sampling on the radioactive liquid waste from the adjustment tank 34 or the pipe 33 instead of providing the measuring device 49.

The measuring device 49 may be provided in each of the radioactive liquid waste treatment apparatuses used in Examples 6 to 8.

REFERENCE SIGNS LIST 1, 1A, 1B, 1C, 1D, 29, 29A, 29B, 29C: radioactive liquid waste treatment apparatus
2: filtration device
3, 3A: colloid removal device
4, 4A: electrostatic filter
5, 5B, 32, 40: adsorption device
6, 6B: adsorption tower
12: radiation detector
14, 16: on-off valve
15: bypass pipe
18, 34: adjustment tank
19, 37: pH adjusting agent supply device
20, 43: pH adjusting agent tank
21, 38: pH adjusting agent supply pipe
34A: liquid adjusting unit
35: oxidizing agent supply device
36: oxidizing agent supply pipe 41: oxidizing agent tank
44, 45: changeover valve
46A, 46B: return pipe
47: liquid waste storage tank
49: measuring device

The invention claimed is:

1. A method of treating radioactive liquid waste comprising:
supplying radioactive liquid waste which contains a colloidal substance, a particulate substance having a particle diameter greater than that of the colloidal substance, and a radioactive substance to a filtration device such that the particulate substance is removed by the filtration device;
removing the colloidal substance which is contained in the radioactive liquid waste discharged from the filtration device using an electrostatic filter;
allowing the radioactive liquid waste from which the colloidal substance is removed to be supplied to an adsorption device; and
removing the radioactive substance contained in the radioactive liquid waste using the adsorption device.

2. The method of treating radioactive liquid waste according to claim 1, wherein the removal of the colloidal substance which is negatively charged, is performed using the electrostatic filter which is positively charged.

3. The method of treating radioactive liquid waste according to claim 1, wherein the removal of the colloidal substance which is positively charged, is performed using the electrostatic filter which is negatively charged.

4. The method of treating radioactive liquid waste according to claim 1,
wherein when the radioactivity concentration of the radioactive liquid waste from which the colloidal substance is removed is measured and the measured radioactivity concentration is greater than the measurement lower limit of the radioactivity concentration, the radioactive liquid waste from which the colloidal substance is removed is supplied to the adsorption device, and
when the measured radioactivity concentration is less than or equal to the measurement lower limit, the radioactive liquid waste from which the colloidal substance is removed is allowed to bypass the adsorption device.

5. A radioactive liquid waste treatment apparatus comprising:
a filtration device which removes a particulate substance having a particle diameter greater than that of a colloidal substance;
a colloid removal device which is connected to the filtration device and includes an electrostatic filter removing the colloidal substance; and
an adsorption device which is connected to the colloid removal device and includes an adsorption material adsorbing a radioactive substance.

6. The radioactive liquid waste treatment apparatus according to claim 5, wherein the colloid removal device has a first colloid removal device including a first electrostatic filter that removes the negatively charged colloidal substance and is positively charged, and a second colloid removal device including a second electrostatic filter that removes the positively charged colloidal substance and is negatively charged.

7. The radioactive liquid waste treatment apparatus according to claim 5, further comprising:
a connection pipe which connects the colloid removal device with the adsorption device;
a first on-off valve which is provided in the connection pipe;
a bypass pipe which is connected to the connection pipe between the colloid removal device and the first on-off valve and bypasses the adsorption device;
a second on-off valve which is provided in the bypass pipe; and
a radiation detector which measures the radioactivity concentration of the radioactive liquid waste flowing in the connection pipe on the upstream side of the first on-off valve.

8. The radioactive liquid waste treatment apparatus according to claim 5, wherein the adsorption material that adsorbs the radioactive substance in the adsorption device is at least one of zeolite, ferrocyanide, a titanic acid compound, a titanate compound, an ion exchange resin, a chelate resin, activated carbon, and impregnated activated carbon.

9. A method of treating radioactive liquid waste comprising:
supplying radioactive liquid waste which contains a colloidal substance, a particulate substance having a particle diameter greater than that of the colloidal substance, and a radioactive substance to a filtration device such that the particulate substance is removed by the filtration device;
removing the colloidal substance which is contained in the radioactive liquid waste discharged from the filtration device;
allowing the radioactive liquid waste from which the colloidal substance is removed to be supplied to a first adsorption device;
removing a radioactive nuclide contained in the radioactive liquid waste using the first adsorption device;
arranging the radioactive liquid waste discharged from the first adsorption device on the downstream side of the first adsorption device; and
supplying the discharged radioactive liquid waste to a second adsorption device filled with an adsorbent that carries an oxine group on the surface thereof.

10. The method of treating radioactive liquid waste according to claim 9, wherein the colloidal substance is removed by an electrostatic filter.

11. The method of treating radioactive liquid waste according to claim 10, wherein the removal of the colloidal substance which is negatively charged, is performed using the electrostatic filter which is positively charged.

12. The method of treating radioactive liquid waste according to claim 9, further comprising:
injecting at least one of an oxidizing agent, a pH adjusting agent, and a reducing agent to the radioactive liquid waste in which ions of the radioactive nuclide are removed using the first adsorption device;
removing the ions of the radioactive nuclide, which are generated in the radioactive liquid waste due to the injection of at least one of the oxidizing agent, the pH adjusting agent, and the reducing agent, by an adsorbent in a third adsorption device; and
supplying the radioactive liquid waste discharged from the third adsorption device to the second adsorption device.

13. The method of treating radioactive liquid waste according to claim 12, further comprising:
supplying the radioactive liquid waste discharged from the first adsorption device to a liquid adjusting unit; and
performing injection of at least one of the oxidizing agent, the pH adjusting agent, and the reducing agent to the radioactive liquid waste in the liquid adjusting unit.

14. A radioactive liquid waste treatment apparatus comprising:
- a filtration device which removes a particulate substance having a particle diameter greater than that of a colloidal substance from radioactive liquid waste;
- a colloid removal device which is connected to the filtration device and removes the colloidal substance;
- a first adsorption device which is connected to the colloid removal device and includes an adsorbent adsorbing a radioactive nuclide; and
- a second adsorption device which is connected to the first adsorption device by being arranged on the downstream side of the first adsorption device and is filled with an adsorbent carrying an oxine group on the surface thereof.

15. The radioactive liquid waste treatment apparatus according to claim 14, wherein the colloid removal device includes an electrostatic filter that removes the colloidal substance.

16. The radioactive liquid waste treatment apparatus according to claim 14, further comprising:
- an injection device which injects at least one of an oxidizing agent, a pH adjusting agent, and a reducing agent to the radioactive liquid waste from which the radioactive nuclide is removed and discharged from the first adsorption device; and
- a third adsorption device which removes ions of the radioactive nuclide generated in the radioactive liquid waste due to the injection of at least one of the oxidizing agent, the pH adjusting agent, and the reducing agent,
- wherein the second adsorption device is arranged on the downstream side of the third adsorption device and connected to the third adsorption device.

17. A method of treating radioactive liquid waste comprising:
- supplying radioactive liquid waste which contains a radioactive nuclide to a first adsorption device;
- removing ions of the radioactive nuclide contained in the radioactive liquid waste by an adsorbent in the first adsorption device;
- injecting at least one of an oxidizing agent, a pH adjusting agent, and a reducing agent to the radioactive liquid waste discharged from the first adsorption device; and
- removing the ions of the radioactive nuclide, which are generated in the radioactive liquid waste due to the injection of at least one of the oxidizing agent, the pH adjusting agent, and the reducing agent, by an adsorbent in a second adsorption device.

18. The method of treating radioactive liquid waste according to claim 17, further comprising:
- supplying the radioactive liquid waste discharged from the first adsorption device to a liquid adjusting unit; and
- performing injection of at least one of the oxidizing agent, the pH adjusting agent, and the reducing agent to the radioactive liquid waste in the liquid adjusting unit.

19. A method of treating radioactive liquid waste comprising:
- supplying radioactive liquid waste which contains a radioactive nuclide to an adsorption device;
- removing ions of the radioactive nuclide contained in the radioactive liquid waste by an adsorbent in the adsorption device;
- injecting at least one of an oxidizing agent, a pH adjusting agent, and a reducing agent to the radioactive liquid waste discharged from the adsorption device;
- supplying the radioactive liquid waste which contains ions of the radioactive nuclide, generated due to the injection of at least one of the oxidizing agent, the pH adjusting agent, and the reducing agent, to the adsorption device; and
- removing the ions which are contained in the radioactive liquid waste and generated due to the injection of at least one of the oxidizing agent, the pH adjusting agent, and the reducing agent, by the adsorbent in the adsorption device.

20. The method of treating radioactive liquid waste according to claim 19, further comprising:
- supplying the radioactive liquid waste discharged from the adsorption device to a liquid adjusting unit; and
- performing injection of at least one of the oxidizing agent, the pH adjusting agent, and the reducing agent to the radioactive liquid waste in the liquid adjusting unit.

21. The method of treating radioactive liquid waste according to claim 17, further comprising:
- measuring the pH of the radioactive liquid waste; and
- controlling the injection amount of the pH adjusting agent to be injected to the radioactive liquid waste based on the measured pH value.

22. The method of treating radioactive liquid waste according to claim 17, further comprising:
- measuring an oxidation-reduction potential of the radioactive liquid waste; and
- controlling the injection amount of at least one of the oxidizing agent and the reducing agent to be injected to the radioactive liquid waste based on the measured value of the oxidation-reduction potential.

23. A radioactive liquid waste treatment apparatus comprising:
- a first adsorption device which supplies radioactive liquid waste containing a radioactive nuclide;
- an injection device which injects at least one of an oxidizing agent, a pH adjusting agent, and a reducing agent to the radioactive liquid waste from which the radioactive nuclide is removed and then discharged from the first adsorption device; and
- a second adsorption device which removes ions of the radioactive nuclide, generated in the radioactive liquid waste due to the injection of at least one of the oxidizing agent, the pH adjusting agent, and the reducing agent.

24. The radioactive liquid waste treatment apparatus according to claim 23, further comprising:
- a liquid adjusting unit to which the radioactive liquid waste from the first adsorption device is supplied,
- wherein the injection device is connected to the liquid adjusting unit.

25. A radioactive liquid waste treatment apparatus comprising:
- an adsorption device which supplies radioactive liquid waste containing radioactive nuclide;
- an injection device which injects at least one of an oxidizing agent, a pH adjusting agent, and a reducing agent to the radioactive liquid waste from which the radioactive nuclide is removed and then discharged from the adsorption device; and
- a radioactive liquid waste supply device which leads the radioactive liquid waste containing ions of the radioactive nuclide, generated due to the injection of at least one of the oxidizing agent, the pH adjusting agent, and the reducing agent, to the adsorption device.

26. The radioactive liquid waste treatment apparatus according to claim 23, further comprising:

a measuring device which measures the pH of the radioactive liquid waste before at least one of the oxidizing agent, the pH adjusting agent, and the reducing agent is injected.

27. The radioactive liquid waste treatment apparatus according to claim 23, further comprising:
a measuring device which measures an oxidation-reduction potential of the radioactive liquid waste before at least one of the oxidizing agent, the pH adjusting agent, and the reducing agent is injected.

* * * * *